United States Patent
Lee et al.

(10) Patent No.: US 12,369,082 B2
(45) Date of Patent: Jul. 22, 2025

(54) DEVICE AND METHOD FOR PROCESSING SERVICE POLICY IN WIRELESS COMMUNICATION SYSTEM

(71) Applicant: Samsung Electronics Co., Ltd., Suwon-si (KR)

(72) Inventors: Hoyeon Lee, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 758 days.

(21) Appl. No.: 17/594,100

(22) PCT Filed: Apr. 2, 2020

(86) PCT No.: PCT/KR2020/004533
§ 371 (c)(1),
(2) Date: Oct. 1, 2021

(87) PCT Pub. No.: WO2020/204641
PCT Pub. Date: Oct. 8, 2020

(65) Prior Publication Data
US 2022/0159527 A1    May 19, 2022

(30) Foreign Application Priority Data
Apr. 2, 2019 (KR) .................. 10-2019-0038279
Feb. 18, 2020 (KR) .................. 10-2020-0019909

(51) Int. Cl.
*H04W 76/14* (2018.01)
*H04W 4/40* (2018.01)
(Continued)

(52) U.S. Cl.
CPC ......... *H04W 36/0066* (2013.01); *H04W 4/40* (2018.02); *H04W 4/50* (2018.02);
(Continued)

(58) Field of Classification Search
CPC ..... H04W 36/0066; H04W 4/40; H04W 4/50; H04W 8/22; H04W 28/0268;
(Continued)

(56) References Cited

U.S. PATENT DOCUMENTS 9,826,564 B2 * 11/2017 Kweon .................. H04L 67/12
10,827,409 B2    11/2020 Kim et al.
(Continued)

FOREIGN PATENT DOCUMENTS

| CN | 108029009 A | 5/2018 |
|----|-------------|--------|
| CN | 108476394 A | 8/2018 |
| KR | 10-2020-0039306 A | 4/2020 |
| WO | 2018117774 A1 | 6/2018 |
| WO | 2018128505 A1 | 7/2018 |

OTHER PUBLICATIONS

Supplementary European Search Report dated Aug. 12, 2022 in connection with European Patent Application No. 20 78 2745, 19 pages.

(Continued)

*Primary Examiner* — Julio R Perez

(57) ABSTRACT

The present disclosure relates to a 5th (5G) generation or pre-5G communication system for supporting a higher data transmission rate beyond a 4th (4G) generation communication system such as long term evolution (LTE). The present disclosure is to process policy and parameter information for providing a service in a wireless communication system, and an operating method of a base station may include obtaining mapping information of service quality related to direct communication between a first system and a second system, and switching between the quality of service of the first system and the quality of service of the second system using the mapping information.

6 Claims, 18 Drawing Sheets

(51) Int. Cl.
    *H04W 4/50*    (2018.01)
    *H04W 8/22*    (2009.01)
    *H04W 28/02*   (2009.01)
    *H04W 28/24*   (2009.01)
    *H04W 36/00*   (2009.01)
    *H04W 88/06*   (2009.01)

(52) U.S. Cl.
    CPC ......... *H04W 8/22* (2013.01); *H04W 28/0268* (2013.01); *H04W 28/24* (2013.01); *H04W 36/037* (2023.05); *H04W 76/14* (2018.02); *H04W 88/06* (2013.01)

(58) Field of Classification Search
    CPC ..... H04W 28/24; H04W 76/14; H04W 88/06; H04W 12/08; H04W 12/60; H04W 36/037; H04W 60/04; H04W 8/24; H04W 92/18
    See application file for complete search history.

(56) References Cited

U.S. PATENT DOCUMENTS

| | | | |
|---|---|---|---|
| 10,880,710 | B2 | 12/2020 | Baek et al. |
| 2012/0014281 | A1 | 1/2012 | Chun et al. |
| 2016/0374134 | A1* | 12/2016 | Kweon .............. H04W 4/70 |
| 2018/0352448 | A1 | 12/2018 | Ryu et al. |
| 2019/0037448 | A1* | 1/2019 | Shan ................ H04W 60/04 |
| 2019/0394625 | A1 | 12/2019 | Kim et al. |
| 2020/0100088 | A1 | 3/2020 | Kim et al. |
| 2020/0112850 | A1 | 4/2020 | Lee et al. |
| 2020/0137711 | A1* | 4/2020 | Cho .................. H04W 8/06 |
| 2022/0095260 | A1* | 3/2022 | Shan ................ H04W 60/04 |
| 2022/0159527 | A1* | 5/2022 | Lee .................. H04W 8/24 |

OTHER PUBLICATIONS

International Search Report and Written Opinion of the International Searching Authority dated Jul. 17, 2020 in connection with International Application No. PCT/KR2020/004533, 12 pages.

LG Electronics, "Update of Solution#6," S2-186587 (revision of S2-18xxxx), SA WG2 Meeting #128, Vilnius, Lithuania, Jul. 2-6, 2018, 7 pages.

Tencent, "QoS Handling for V2X communication over PC5 reference point," S2-1900074 (Revision of S2-19xxxx), 3GPP TSG-SA WG2 Meeting #130, Kochi, India, Jan. 21-25, 2019, 2 pages.

ZTE, et al., "Considerations on NR V2X," R3-186422, 3GPP TSG RAN WG3 Meeting #102, Spokane, USA, Nov. 12-16, 2018, 3 pages.

ETSI TS 123 285 V16.3.0 (Jul. 2020), Universal Mobile Telecommunications System (UMTS); LTE; Architecture enhancements for V2X services (3GPP TS 23.285 version 16.3.0 Release 16), Jul. 2020, 40 pages.

Supplementary Partial European Search Report dated May 9, 2022, in connection with European Application No. 20782745.2, 21 pages.

3GPP TR 23.786 V16.0.0 (Mar. 2019), Technical Report, 3rd Generation Partnership Project; Technical Specification Group Services and System Aspects; Study on architecture enhancements for the Evolved Packet System (EPS) and the 5G System (5GS) to support advanced V2X services (Release 16), Mar. 2019, 37 pages.

3GPP TS 23.285 V16.0.0 (Mar. 2019), Technical Specification, 3rd Generation Partnership Project; Technical Specification Group Services and System Aspects; Architecture enhancements for V2X services (Release 16), Mar. 2019, 37 pages.

Intel, "Update on Functional Entities description," S2-1901886 (revision of S2-190xxxx), SA WG2 Meeting #131, Santa Cruz, Tenerife, Spain, Feb. 25-Mar. 2019, 2 pages.

Communication pursuant to Article 94(3) EPC dated Jul. 18, 2024, in connection with European Application No. 20782745.2, 13 pages.

LG Electronics, "Conclusion of KI#13," S2-1811965 (revision of S2-18xxxx), SA WG2 Meeting #129bis, West Palm Beach, USA, Nov. 26-30, 2018, 3 pages.

Notification of The First Office Action issued Dec. 25, 2024, in connection with Chinese Patent Application No. 202080027413.2, 21 pages.

Vice-Chair (InterDigital), "Report of the LTE break-out session (ProSe and eDRX)," R2-153885, 3GPP TSG RAN WG2 #91, Beijing, China, Aug. 24-28, 2015, 21 pages.

* cited by examiner

DEVICE AND METHOD FOR PROCESSING SERVICE POLICY IN WIRELESS COMMUNICATION SYSTEM

CROSS-REFERENCE TO RELATED APPLICATIONS

This application is a 371 National Stage of International Application No. PCT/KR2020/004533, filed on Apr. 2, 2020, which claims priority to Korean Patent Application No. 10-2019-0038279, filed Apr. 2, 2019, and Korean Patent Application No. 10-2020-0019909, filed Feb. 18, 2020, the disclosures of which are herein incorporated by reference in their entirety.

BACKGROUND

1. Field

The present disclosure generally relates to a wireless communication system, and more specifically, to an apparatus and a method for processing policy and parameter information for providing a service in the wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation. Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

The 5G system is considering supporting various services compared to the existing 4G system. For example, the most representative services are enhanced mobile broad band (eMBB), ultra-reliable and low latency communication (URLLC), massive machine type communication (mMTC), evolved multimedia broadcast/multicast service (eMBMS), and so on. A system providing the URLLC service may be referred to as a URLLC system, and a system providing the eMBB service may be referred to as an eMBB system. Herein, the terms service and system may be used interchangeably.

Meanwhile, the Internet is evolving from a human-centered connection network in which humans create and consume information, to an Internet of things (IoT) network which exchanges and processes information between distributed components such as objects. Internet of everything (IoE) technology which combines IoT technology with big data processing technology through connection with a cloud server is also emerging. To implement the IoT, technology elements such as sensing technology, wired and wireless communication and network infrastructure, service interface technology, and security technology are required, and techniques such as a sensor network for connection between objects, machine to machine (M2M), and machine type communication (MTC) are recently studied. The IoT environment may provide intelligent internet technology (IT) service which creates a new value in human life by collecting and analyzing data generated from the connected objects. The IoT may be applied to fields such as a smart home, a smart building, a smart city, a smart car or a connected car, a smart grid, health care, smart home appliances, and advanced medical services through convergence and composition between the existing IT and various industries.

Hence, various attempts for applying the 5G communication system to the IoT network are being made. For example, the technologies such as sensor network, M2M, and MTC are implemented by schemes such as beamforming, MIMO, and array antenna which are the 5G communication technologies. Applying a cloud radio access network (RAN) as the big data processing technology as aforementioned may be said to be an example of the convergence of the 5G technology and the IoT technology.

Vehicle to everything (V2X) is a general term which refers to all kinds of the communication scheme applicable to a road vehicle, and various additional services are available besides an initial safety use case in combination with the wireless communication technology development. A wireless access in vehicular environments (WAVE) standard based on institute of electrical and electronical engineers (IEEE) 802.11p and IEEE P1609 is standardized as V2X service provision technology. However, the WAVE which is a kind of dedicated short range communication (DSRC) technology has limitation in that a message transmission distance between a vehicle and a vehicle is limited.

To overcome this limitation, 3rd generation partnership project (3GPP) is working on a cellular-based V2X technology standard. Release 14/Release 15 has completed LTE-based evolved packet system (EPS) V2X standard, and Release 16 is working on new radio (NR)-based 5th generation system (5GS) V2X standardization.

SUMMARY

Based on the discussions described above, the present disclosure provides an apparatus and a method for effectively processing policy and parameter information for providing a service in a wireless communication system.

In addition, the present disclosure provides an apparatus and a method for providing mapping information of quality of service (QoS) parameters for direct communication in a wireless communication system.

In addition, the present disclosure provides an apparatus and a method for switching QoS parameters for direct communication in a wireless communication system.

According to various embodiments of the present disclosure, an operating method of a base station in a wireless communication system may include obtaining mapping information of service quality related to direct communication between a first system and a second system, and switching between the quality of service of the first system and the quality of service of the second system using the mapping information.

According to various embodiments of the present disclosure, an operating method of a terminal in a wireless communication system in a wireless communication system may include obtaining mapping information of service quality related to direct communication between a first system and a second system, and switching between the quality of service of the first system and the quality of service of the second system using the mapping information.

According to various embodiments of the present disclosure, a base station apparatus in a wireless communication system may include at least one transceiver, and at least one processor connected to the at least one transceiver, and the at least one processor may control to obtain mapping information of quality of service related to direct communication between a first system and a second system, and to switch between the quality of service of the first system and the quality of service of the second system using the mapping information.

According to various embodiments of the present disclosure, a terminal apparatus in a wireless communication system may include a transceiver and at least one processor connected to the transceiver, and the at least one processor may control to obtain mapping information of quality of service related to direct communication between a first system and a second system, and to switch between the quality of service of the first system and the quality of service of the second system using the mapping information.

An apparatus and a method according to various embodiments of the present disclosure, may effectively operate direct communication between different systems, by using information of service quality mapping information related to direct communication between a first system and a second system.

Effects obtainable from the present disclosure are not limited to the above-mentioned effects, and other effects which are not mentioned may be clearly understood by those skilled in the art of the present disclosure through the following descriptions.

DETAILED DESCRIPTION

Figure 1:
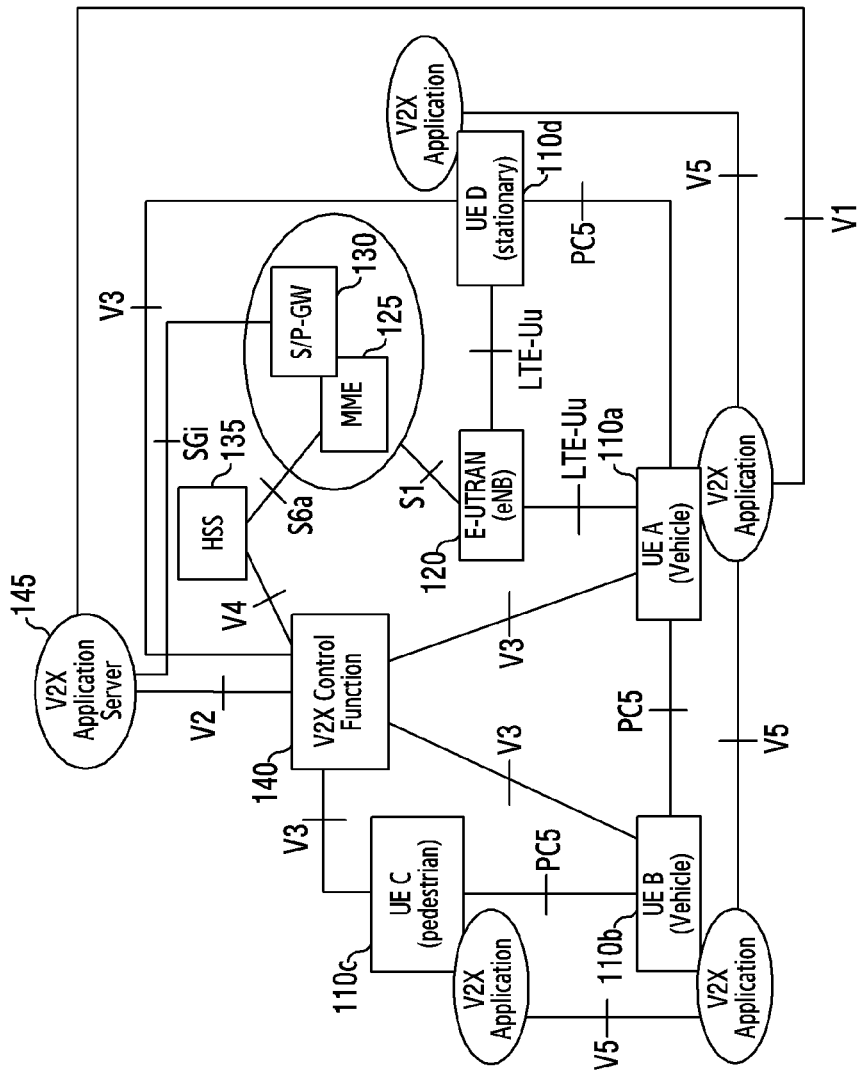
FIG. 1 illustrates a structure of a first communication system according to an embodiment of the present disclosure.

Terms used in the present disclosure are used for describing particular embodiments, and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. The terms defined in a general dictionary among terms used in the present disclosure may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach is described as an example. However, since the various embodiments of the present disclosure include a technology using both hardware and software, the various embodiments of the present disclosure do not exclude a software-based approach.

Hereinafter, the present disclosure relates to an apparatus and a method for processing policy and parameter information for providing a service in a wireless communication system. Particularly, the present disclosure describes a technique for switching between parameters for direct communication (e.g., PC5 communication, proximity service (ProSe), sidelink communication, vehicle to everything (V2X) communication) between user equipments (UEs) in the wireless communication system.

Terms for identifying access nodes, terms indicating network entities, terms indicating messages, terms indicating interfaces between network entities, and terms indicating various identification information, which are used in the following descriptions, are for the sake of explanations. Accordingly, the present disclosure is not limited to the terms to be described, and may use other terms referring to a subject having technically identical meaning.

To ease the following description, the present disclosure describes various embodiments using terms and names defined in specifications for an evolved packet system (EPS) system and a 5th generation (5G) system, which is illustrations for explanations. Various embodiments of the present disclosure may be easily modified and applied to other communication system.

In describing the embodiments of the present disclosure in detail, a communication standard defined by 3rd Generation Partnership Project (3GPP) shall be mainly targeted, but the main subject of the present disclosure may be applied to other communication system having similar technical background with slight modification within a range not significantly departing from the scope of the present disclosure, which will be determined by those having technical background skilled in the technical field of the present disclosure.

In describing the embodiments of the present disclosure in detail, a vehicle communication service will be mainly targeted, but the main subject of the present disclosure may be applied to other services provided in the EPS network or the 5G network with slight modifications within a range not significantly departing from the scope of the present disclosure, which will be determined by those having technical background skilled in the technical field of the present disclosure.

FIG. 1 illustrates a structure of a first communication system according to an embodiment of the present disclosure. According to an embodiment, the first communication system illustrated in FIG. 1 may be a mobile communication system based on a long term evolution (LTE) standard.

Referring to FIG. 1, the first communication system includes an evolved node B (eNB) 120, a mobility management entity (MME) 125, a serving/packet data network-gateway (S/P-GW) 130, a home subscription server (HSS) 135, a V2X control function (CF) 140, and a V2X application server (AS) 145. The S/P-GW 130 may be divided into a serving-gateway (S-GW) and a packet data network-gateway (P-GW). The eNB 120 may be referred to as a 'base station', an 'evolved-universal mobile telecommunication system terrestrial radio access network (E-UTRAN)', a 'radio access network (RAN) node' or other term having an equivalent technical meaning.

A user equipment (UE) 110a, 110b, 110c, or 110d accesses an external network through the eNB 120 and the S/P-GW 130. It is necessary to generate packet data network (PDN) connection for the UE 110a, 110b, 110c or 110d to transmit and receive data through the S/P-GW 130, and one PDN connection may include one or more EPS bearers. The UE 110a, 110b, 110c or 110d may be referred to as a 'terminal', a 'mobile station', a 'subscriber station', a 'remote terminal', a 'wireless terminal', or a 'user device' or other term having an equivalent technical meaning. For the sake of descriptions below, the present disclosure describes embodiments using the UE 110a among the UEs 110a, 110b, 110c, or 110d, and the other UEs 110b, 110, and 110d may operate similarly.

An application function (AF) is a device which exchanges information related to an application at an application level with a user. The V2X AS 145 is a device for providing an application-level V2X service. The V2X AS 145 may include an AF function.

The eNB 120 is an RAN node and corresponds to a radio network controller (RNC) of a UTRAN system and a base station controller (BSC) of a global system for mobile communications (GSM) enhanced data rates for GSM evolution (EDGE) RAN (GERAN) system. The eNB 120 is connected with the UE 110a over a radio channel, and performs a similar role to the existing RNC/BSC.

In the LTE, every user traffic including a real-time service such as voice over Internet protocol (VoIP) over the Internet protocol is serviced over a shared channel. Accordingly, a device for collecting and scheduling context information of the UE 110a is required, and the eNB 120 may serve as a scheduler.

The S/P-GW 130 is a device which provides a data bearer, and generates or removes the data bearer under control of the MME 125. The MME 125 is a device which manages various control functions, and one MME 125 may be connected to a plurality of eNBs including the eNB 120.

The HSS 135 is a device which stores and manages subscription information of the UEs including the UE 110a. The subscription information may be referred to as 'UE subscription information' or 'terminal subscription information'. In addition, the HSS 135 may store subscription information for providing the V2X service. <Table 1> is an example of the V2X service related subscription information managed by the HSS 135.

TABLE 1 a) whether the UE is authorized to perform V2X communication over PC5 reference point as Vehicle UE, Pedestrian UE, or both.
b) UE-PC5-AMBR for V2X communication over PC5 reference point, including UE-PC5-AMBR for LTE PC5.
c) UE-PC5-AMBR for V2X communication over PC5 reference point, including UE-PC5-AMBR for NR PC5.

TABLE 1-continued d) the list of the PLMNs where the UE is authorized to perform V2X communication over PC5 reference point.
e) cross-RAT PC5 control authorization.

The V2X CF 140 is a device which manages service policy and parameter information to provide the V2X service. <Table 2> and <Table 3> show examples of the V2X service policy and parameter information managed by the V2X CF 140. The UE 110a may establish a PDN connection with the V2X CF 140 through the eNB 120 and the S/P-GW 130 through a procedure shown in FIG. 8A, that is, after completing registration in the network, and obtain V2X service policy and parameter information from the V2X CF 140. Alternatively, the V2X service policy and parameter information shown in <Table 2> or <Table 3> may be pre-configured in the UE 110a, and the UE 110a may use the pre-configured information. <Table 2> is the example of V2X service policy and parameters for direct communication (e.g., ProSe).

TABLE 2

1) Authorization policy:
When the UE is "served by E-UTRA" or "served by NR":
PLMNs in which the UE is authorized to perform V2X communications over PC5
reference point when "served by E-UTRA" or "served by NR".
For each above PLMN:
RAT(s) over which the UE is authorized to perform V2X communications over PC5
reference point.
When the UE is "not served by E-UTRA" and "not served by NR":
Indicates whether the UE is authorized to perform V2X communications over PC5
reference point when "not served by E-UTRA" and "not served by NR".
RAT(s) over which the UE is authorized to perform V2X communications over PC5
reference point.
2) Radio parameters when the UE is "not served by E-UTRA" and "not served by NR":
Includes the radio parameters per PC5 RAT (i.e. LTE PC5, NR PC5) with
Geographical Area(s) and an indication of whether they are "operator managed" or "non-
operator managed". The UE uses the radio parameters to perform V2X communications over
PC5 reference point when "not served by E-UTRA" and "not served by NR" only if the UE
can reliably locate itself in the corresponding Geographical Area. Otherwise, the UE is not
authorized to transmit.
NOTE: Whether a frequency band is "operator managed" or "non-operator managed" in a
given Geographical Area is defined by local regulations.
3) Policy/parameters per RAT for PC5 Tx Profile selection:
The mapping of service types (e.g. PSID or ITS-AIDs) to Tx Profiles.
4) Policy/parameters related to privacy:
The list of V2X services, e.g. PSID or ITS-AIDs of the V2X applications, with
Geographical Area(s) that require privacy support.
5) Policy/parameters when LTE PC5 is selected:
The mapping of Destination Layer-2 ID(s) and the V2X services, e.g. PSID or ITS-
AIDs of the V2X application.
NOTE 2: PLMN operators coordinate to make sure Destination Layer-2 ID(s) for
different V2X services are configured in a consistent manner.
NOTE 3: To pre-configure a UE with the provisioning parameters, at least the "not
served by E-UTRAN" parameters of 1) and 2), and the parameters of 3) need to be included.
The mapping of ProSe Per-Packet Priority and packet delay budget for V2X
communication (autonomous resources selection mode).
The mapping of service types (e.g. PSID or ITS-AIDs) to V2X frequencies (see
TS 36.300 [10] for further information) with Geographical Area(s).
The list of V2X services, e.g. PSID or ITS-AIDs of the V2X applications, allowed to
use a specific PPPR value.
6) Policy/parameters when NR PC5 is selected:
The mapping of service types (e.g. PSID or ITS-AIDs) to V2X frequencies with
Geographical Area(s).
The destination Layer-2 ID for PC5 unicast link establishment.
The list of V2X services that are allowed to use a specific 5QI
7) Policy/parameters related to QoS:
The mapping of PPPP and 5QI.
The mapping of PPPR and 5QI.

In describing the embodiments of the present disclosure, QoS related parameters defined in the 5G system may be referred to as '5G quality of service indicator (5QI)' or 'PC5 5QI (PQI)', and 5QI' and 'PQI' may be used interchangeably. <Table 3> is the example of V2X service policy and parameters for network communication (e.g., Uu communication).

TABLE 3

1) PLMNs in which the UE is authorized to use MBMS based V2X communication.
Corresponding V2X USD(s) for receiving MBMS based V2X traffic in the PLMN. The V2X USD(s) may be obtained through the V2 reference point from the V2X Application Server.
NOTE: The V2 reference point procedure is not specified in this Release.
2) V2X Application Server address information.
List of FQDNs or IP addresses of the V2X Application Servers, associated with served geographical area information and list of PLMNs that the configuration applies to.
3) V2X Application Sever discovery using MBMS.
List of PLMNs and corresponding V2X Server USDs for receiving V2X Application Server information via MBMS.
4) Mapping of the V2X services, e.g. PSID or ITS-AIDs of the V2X application to:
V2X Application Server address (consisting of IP address/FQDN and UDP port) for unicast, - V2X USD for MBMS.

To provide the LTE PC5 communication, a quality of service (QoS) model based on ProSe per packet priority (PPPP)/ProSe per packet reliability (PPPR) may be used. The QoS parameters for the LTE PC5 communication may include PPPP and PPPR. The PPPP may include a value indicating a priority level. For example, the PPPP may be expressed as a value ranging from '1' to '8'. If the PPPP is '1', it may be determined that its priority is higher than the PPPP which is '2'. The PPPR may include a value indicating a reliability level. For example, the PPPR may be expressed as a value ranging from '1' to '8'. If the PPPR is '1', it may be determined that higher reliability is required than the PPPR which is '2'.

To provide new radio (NR) PC5 communication, a QoS model based on the PQI may be used. A QoS parameter for the NR PC5 communication, i.e., the PQI may include at least one of a priority level, a packet delay budget, a packet error rate, an averaging window, and a maximum data burst volume. In addition, to provide the NR PC5 communication, a communication range value may be used together with the PQI. The following <Table 4> shows an example of the PQI. <Table 4> is the example of the 5QI value defined in the 3GPP standard.

TABLE 4

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR | 20 | 100 ms (NOTE 11, NOTE 13) | $10^{-2}$ | N/A | 2000 ms | Conversational Voice |
| 2 | (NOTE 1) | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution - medium voltage, Process automation - monitoring |

TABLE 4-continued

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e g., MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 5 | Non-GBR | 10 | 100 ms NOTE 10, NOTE 13) | $10^{-6}$ | N/A | N/A | IMS Signalling |
| 6 | (NOTE 1) | 60 | 300 ms (NOTE 10, NOTE 13) | $10^{-6}$ | N/A | N/A | Video (Buffered Streaming)TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming)Interactive Gaming |
| 8 | | 80 | 300 ms (NOTE 13) | $10^{-6}$ | N/A | N/A | Video (Buffered Streaming)TCP-based (e.g., www, e-mail, chat, ftp, p2p file sharing, progressive video, etc.) |
| 9 | | 90 | | | | | |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |

TABLE 4-continued

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 85 | | 21 | 5 ms (NOTE 5) | $10^{-5}$ | 255 bytes | 2000 ms | Electricity Distribution- high voltage (see TS 22.261 [2]) |

NOTE 1:
A packet which is delayed more than PDB is not counted as lost, thus not included in the PER.
NOTE 2:
It is required that default MDBV is supported by a PLMN supporting the related 5QIs.
NOTE 3:
This MDBV value is set to 1354 bytes to avoid IP fragmentation for the IPv6 based, IPSec protected GTP tunnel to the 5G-AN node (the value is calculated as in Annex C of TS 23.060 [56] and further reduced by 4 bytes to allow for the usage of a GTP-U extension header).
NOTE 4:
A delay of 1 ms for the delay between a UPF terminating N6 and a 5G-AN should be subtracted from a given PDB to derive the packet delay budget that applies to the radio interface.
NOTE 5:
A delay of 2 ms for the delay between a UPF terminating N6 and a 5G-AN should be subtracted from a given PDB to derive the packet delay budget that applies to the radio interface.
NOTE 6:
A delay of 5 ms for the delay between a UPF terminating N6 and a 5G-AN should be subtracted from a given PDB to derive the packet delay budget that applies to the radio interface.
NOTE 7:
For Mission Critical services, it may be assumed that the UPF terminating N6 is located "close" to the 5G_AN (roughly 10 ms) and is not normally used in a long distance, home routed roaming situation. Hence delay of 10 ms for the delay between a UPF terminating N6 and a 5G_AN should be subtracted from this PDB to derive the packet delay budget that applies to the radio interface.
NOTE 8:
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
NOTE 9:
It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.
NOTE 10:
In both RRC Idle and RRC Connected mode, the PDB requirement for these 5QIs can be relaxed for the first packet(s) in a downlink data or signalling burst in order to permit battery saving (DRX) techniques.
NOTE 11:
In RRC Idle mode, the PDB requirement for these 5QIs can be relaxed for the first packet(s) in a downlink data or signalling burst in order to permit battery saving (DRX) techniques.
NOTE 12:
This 5QI value can only be assigned upon request from the network side. The UE and any application running on the UE is not allowed to request this 5QI value.
NOTE 13:
A delay of 20 ms for the delay between a UPF terminating N6 and a 5G-AN should be subtracted from a given PDB to derive the packet delay budget that applies to the radio interface.
NOTE 14:
This 5QI is not supported as it is only used for transmission of V2X messages over MBMS bearers as defined in TS 23.285 [72], According to an embodiment of the present disclosure, information related to mapping (hereafter, 'mapping information') between the PPPP/PPPR-based QoS model for the LTE PC5 communication and the PQI-based QoS model for the NR PC5 communication may be defined. For example, the mapping information may be defined as 'policy/parameters related to QoS' of <Table 2>. Specifically, the mapping information may be defined as 'the mapping of PPPP and 5QI', 'the mapping of PPPR and 5QI' as shown in <Table 2>. The mapping information may be determined according to at least one of the following various schemes.

According to an embodiment, to determine PPPP mapping which may be used interchangeably with the priority level of the PQI, a PPPP value or value interval mapped with the priority level value or value interval among the PQI may be defined. For example, priority level values '7' and '15' may be mapped to the PPPP value '1'. As another example, priority level values '0' to '20' may be mapped to the PPPP value '1'.

According to an embodiment, to determine the PPPP mapping which may be used interchangeably with the packet delay budget of the PQI, the packet delay budget mapped with the PPPP may be defined. A packet delay budget value or value interval as the PQI mapped with a packet delay budget value or value interval mapped with the PPPP may be defined. For example, the packet delay budget value mapped with the PPPP value '1' is defined as '110 ms', and the packet delay budget value '110 ms' derived from the PPPP may map the packet delay budget value as the PQI to '110 bms'. As another example, the packet delay budget value '110 ms' derived from the PPPP may be mapped to the interval of the packet delay budget value as the PQI from '0ms' to '110 ms'.

According to an embodiment, to determine the PPPR mapping which may be used interchangeably with the packet error rate of the PQI, a PPPR value or value interval mapped with a packet error rate value or value interval as the PQI may be defined. For example, a packet error rate values '10-6' and '10-5' may be mapped to the PPPR value '1'. As another example, a packet error rate value from '10-6' to '10-5' may be mapped to the PPPR value '1'.

According to an embodiment, a PPPP value and/or a PPPR value mapped with the PQI value may be defined to determine the PPPP or the PPPR which may be used interchangeably with the PQI value (e.g., corresponding to the 5QI value in <Table 4>). For example, the PQI value '1' may be mapped to the PPPP value '1' and/or the PPPR value '5'.

The mapping information between the LTE QoS model (e.g., PPPP/PPPR) and the NR QoS model (e.g., PQI) may be defined as in the various examples described above, and the mapping information between the LTE QoS model and the NR QoS model may be transmitted to at least one of the terminal and the base station through the procedures of FIG. 8A through FIG. 9C.

Figure 2:
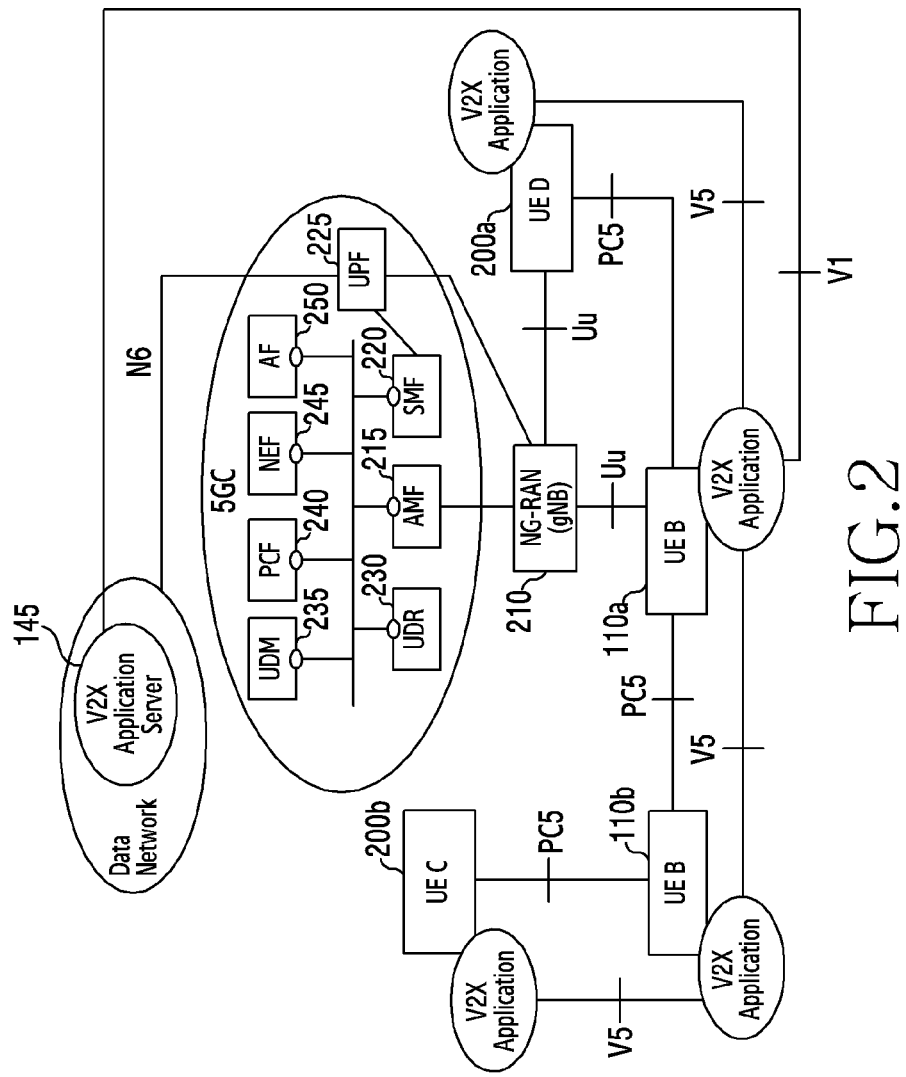
FIG. 2 illustrates a structure of a second communication system according to an embodiment of the present disclosure.

FIG. 2 illustrates a structure of a second communication system according to an embodiment of the present disclosure. According to an embodiment, the second communication system illustrated in FIG. 2 may be a mobile communication system based on 5G.

Referring to FIG. 2, the second communication system includes a next generation node B (gNB) 210, an access and mobility management function (AMF) 215, a session management function (SMF) 220, a user plane function (UPF) 225, unified data management (UDM) 235, unified data repository (UDR) 230, a policy control function (PCF) 240, a network exposure function (NEF) 245, and an application function (AF) 250. The gNB 210 may be referred to as a 'base station', a 'next generation-RAN (NG-RAN)', a 'RAN node', or other term having an equivalent technical meaning.

UEs 110a, 110b, 200a, and 200b access an external network through the gNB 210 and the UPF 225. For the UE to transmit and receive data through the UPF 225, it needs to generate a PDU session, and one PDU session may include one or more QoS flows. The UE 110a, 110b, 200a or 200b may be referred to as a 'terminal', a 'mobile station', a 'subscriber station', a 'remote terminal', a 'wireless terminal', or a 'user device' or other term having an equivalent technical meaning. For the sake of descriptions below, the present disclosure describes embodiments using the UE 110a of the UEs 110a, 110b, 200a, and 200b, and the other UEs 110b, 200a, and 200b may operate similarly.

The gNB 210 is an RAN node and corresponds to the eNB of the EPC system. The gNB 210 is connected to the UE 110a over a radio channel and performs a similar role to the existing RNC/BSC. In the 5G, since every user traffic including a real-time service such as VoIP through Internet protocol is serviced through a shared channel, a device for collecting and scheduling context information of the UE 110a is required, which is managed by the gNB 210.

The AMF 215 is a device which manages various control functions, and one AMF 215 may be connected to a plurality of base stations. The UPF 225 is a device which provides a data bearer, and creates or removes a PDU session under control of the SMF 220. The UDM 235 is a device which stores and manages subscription information of the UE 110a. In addition, the UDM 235 may store subscription information for providing the V2X service. <Table 1> shows the example of the V2X service related subscription information managed by the UDM 235.

The PCF 240 is a device which controls a policy related to the user's QoS, and a policy and charging control (PCC) rule corresponding to the policy is transmitted to and applied to the SMF 220 and the UPF 225. In addition, the PCF 240 may manage service policy and parameter information to provide the V2X service. <Table 2> and <Table 3> show the examples of the V2X service policy and parameter information managed by the PCF 240. The V2X service policy and parameter information may be stored in the UDR 230. The PCF 240 may obtain the V2X service policy and parameter information from the UDR 230. The UE 110a may obtain the V2X service policy and parameter information from the PCF 240 through the procedure shown in FIG. 5. Alternatively, the V2X service policy and parameter information shown in <Table 2> and <Table 3> may be pre-configured in the terminal, and the terminal may use the pre-configured information. The AF 250 is a device which exchanges application related information with the user at the application level. A V2X AS 145 is a device for providing the application level V2X service. The V2X AS 145 may include the AF 250 function.

Figure 3:
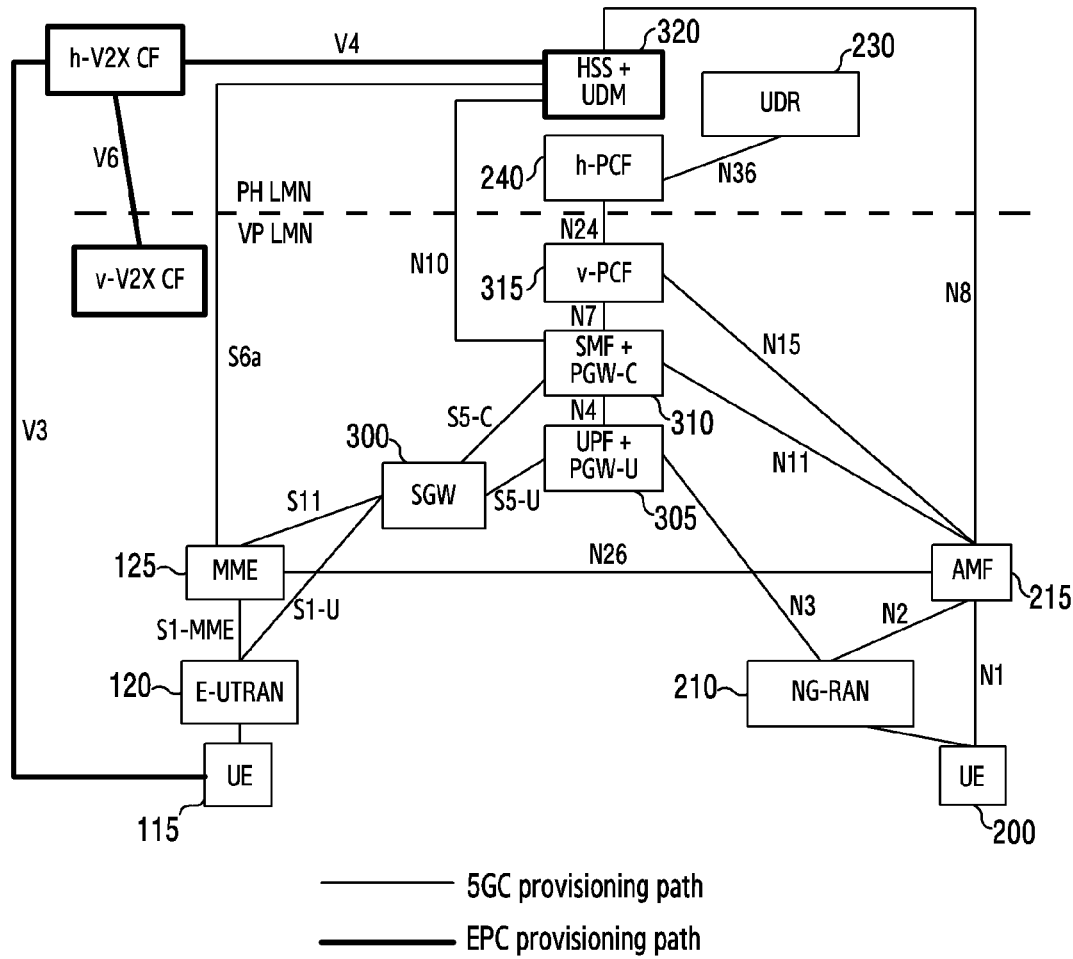
FIG. 3 illustrates an interworking structure between communication systems according to an embodiment of the present disclosure.

FIG. 3 illustrates an interworking structure between communication systems according to an embodiment of the present disclosure. According to an embodiment, the structure illustrated in FIG. 3 may be the interworking structure of the LTE-based mobile communication system and the 5G-based mobile communication system (e.g., NR).

Referring to FIG. 3, for interworking between a first communication system and a second communication system, an SGW 300, a UPF+PG-U 305, an SMF+PGW-C 510, a v-PCF 315, an HSS+UDM 320, and a v-V2X CF 325 may be deployed with the first communication system and the second communication system.

Figure 4:
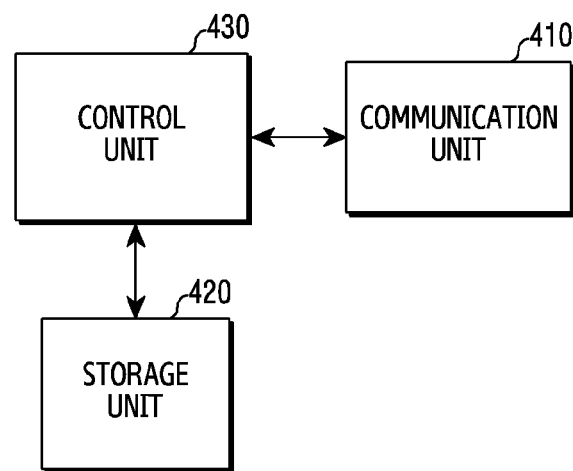
FIG. 4 illustrates a configuration of a network entity in a wireless communication system according to an embodiment of the present disclosure.

FIG. 4 illustrates a configuration of a network entity in a communication system according to an embodiment of the present disclosure. The configuration illustrated in FIG. 4 may be understood as one configuration of an eNB 120, an MME 125, an S/P-GW 130, an HSS 135, a V2X CF 140, a gNB 210, an AMF 215, an SMF 220, a UPF 225, a UDM 235, a UDR 230, a PCF 240, a NEF 245 and an AF 250. A term such as '~unit' or '~er' used hereafter indicates a unit for processing at least one function or operation, and may be implemented using hardware, software, or a combination of hardware and software.

Referring to FIG. 4, the network entity includes a communication unit 410, a storage unit 420, and a control unit 430.

The communication unit 410 provides an interface for performing communication with other devices in the network. That is, the communication unit 410 converts a bit stream transmitted from the network entity to other device into a physical signal, and converts a physical signal received from other device into a bit stream. That is, the communication unit 410 may transmit and receive signals. Accordingly, the communication unit 410 may be referred to as a modem, a transmitter, a receiver or a transceiver. At this time, the communication unit 410 enables the network entity to communicate with other devices or system via backhaul connection (e.g., wired backhaul or wireless backhaul) or via a network.

The storage unit 420 stores a basic program for operating the network entity, an application program, and data such as setting information. The storage unit 420 may include a volatile memory, a non-volatile memory or a combination of a volatile memory and a non-volatile memory. The storage unit 420 provides the stored data according to a request of the control unit 430.

If the network entity of FIG. 4 is a base station (e.g., the eNB 120 or the gNB 210), the network entity may further include a wireless communication unit. The wireless communication unit performs functions for transmitting and receiving signals over a radio channel. For example, the wireless communication unit performs a conversion function between a baseband signal and a bit string according to the physical layer standard of the system. For example, in data transmission, the wireless communication unit generates complex symbols by encoding and modulating a transmit bit stream. In addition, in data reception, the wireless communication unit restores the received bit stream by demodulating and decoding the baseband signal.

In addition, the wireless communication unit up-converts the baseband signal into a radio frequency (RF) band signal, transmits it via an antenna, and down-converts an RF band signal received via the antenna into a baseband signal. For doing so, the wireless communication unit may include a transmit filter, a receive filter, an amplifier, a mixer, an oscillator, a digital to analog convertor (DAC), an analog to digital convertor (ADC), and the like. In addition, the wireless communication unit may include a plurality of transmit/receive paths. Further, the wireless communication unit may include at least one antenna array including a plurality of antenna elements.

In terms of hardware, the wireless communication unit may include a digital unit and an analog unit, and the analog unit may include a plurality of sub-units according to an operating power and an operating frequency. The digital unit may be implemented with at least one processor (e.g., a digital signal processor (DSP)).

The wireless communication unit transmits and receives the signals as stated above. Hence, whole or part of the wireless communication unit may be referred to as 'a transmitter', 'a receiver', or 'a transceiver'. Also, in the following explanations, the transmission and the reception over the radio channel is used as the meaning which embraces the above-stated processing of the wireless communication unit.

The control unit 430 controls general operations of the network entity. For example, the control unit 430 transmits and receives signals through the communication unit 410. In addition, the control unit 430 records and reads data in and from the storage unit 420. For doing so, the control unit 430 may include at least one processor. According to various embodiments, the control unit 430 may control the network entity to perform operations according to various embodiments to be described.

Figure 5:
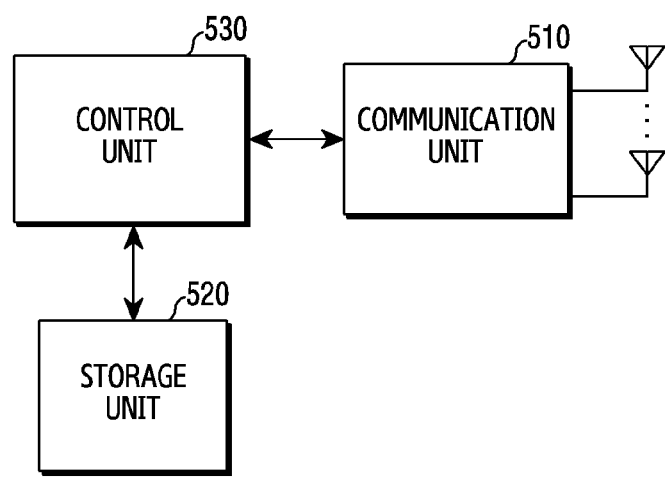
FIG. 5 illustrates a configuration of a terminal in a wireless communication system according to an embodiment of the present disclosure.

FIG. 5 illustrates a configuration of a terminal in a communication system according to an embodiment of the present disclosure. The configuration illustrated in FIG. 5 may be understood as the configuration of the UE 110*a*, 110*b*, 110*c*, 11*d*, 200*a* or 200*b*. A term such as '~unit' or '~er' used hereafter indicates a unit for processing at least one function or operation, and may be implemented using hardware, software, or a combination of hardware and software.

Referring to FIG. 5, the terminal includes a communication unit 510, a storage unit 520, and a control unit 530.

The communication unit 510 may perform functions for transmitting and receiving signals over a radio channel. For example, the communication unit 510 performs a conversion function between a baseband signal and a bit string according to the physical layer standard of the system. For example, in data transmission, the communication unit 510 generates complex symbols by encoding and modulating a transmit bit string. Also, in data reception, the communication unit 510 restores a receive bit string by demodulating and decoding a baseband signal. Also, the communication unit 510 up-converts the baseband signal to an RF band signal, transmits it via an antenna, and down-converts an RF band signal received via the antenna to a baseband signal. For example, the communication unit 510 may include a transmit filter, a receive filter, an amplifier, a mixer, an oscillator, a DAC, an ADC, and the like.

Also, the communication unit 510 may include a plurality of transmit and receive paths. Further, the communication unit 510 may include at least one antenna array including a plurality of antenna elements. In view of the hardware, the communication unit 510 may include a digital circuit and an analog circuit (e.g., an RF integrated circuit (RFIC)). Herein, the digital circuit and the analog circuit may be implemented as a single package. Also, the communication unit 510 may include a plurality of RF chains. Further, the communication unit 510 may perform beamforming.

The communication unit 510 transmits and receives the signals as stated above. Hence, whole or part of the communication unit 510 may be referred to as 'a transmitter', 'a receiver', or 'a transceiver'. In addition, the transmission and the reception over the radio channel are used as the meaning which embraces the above-stated processing of the communication unit 510 in the following explanations.

The storage unit 520 stores a basic program for operating the terminal, an application program, and data such as setting information. The storage unit 520 may include a volatile memory, a non-volatile memory, or a combination of a volatile memory and a non-volatile memory. The storage unit 520 provides the stored data according to a request of the control unit 530.

The control unit 530 controls general operations of the terminal. For example, the control unit 530 transmits and receives signals through the communication unit 510. Also, the control unit 530 records and reads data in and from the storage unit 320. The control unit 530 may execute functions of a protocol stack required by the communication standard. For doing so, the control unit 530 may include at least one processor or microprocessor, or may be part of a processor. In addition, part of the communication unit 510 and the control unit 530 may be referred to as a communication processor (CP). According to various embodiments, the control unit 530 may control the terminal to carry out operations according to various embodiments to be explained.

Figure 6:
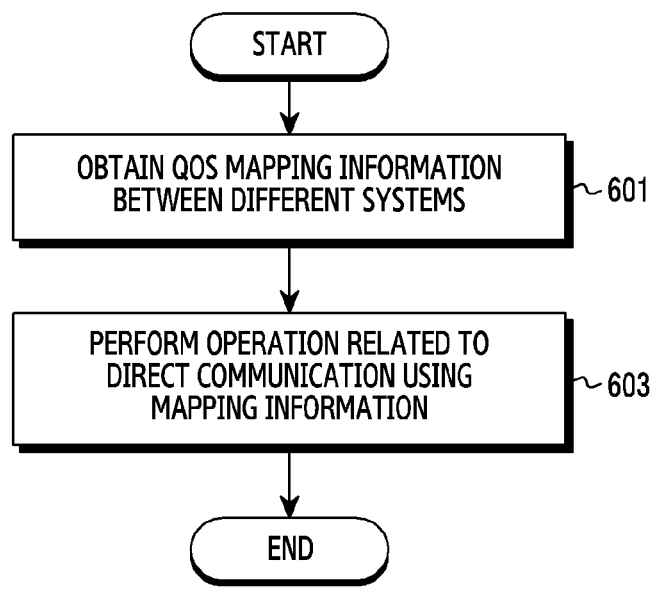
FIG. 6 illustrates a flowchart for using mapping information of service quality in a wireless communication system according to an embodiment of the present disclosure.

FIG. 6 illustrates a flowchart for using mapping information of QoS in a wireless communication system according to an embodiment of the present disclosure. FIG. 6 illustrates an operating method of a device using the QoS mapping information. For example, the device may be a base station (e.g., the eNB 120 or the gNB 210) or a UE (e.g., the UE 110*a*, 110*b*, 110*c*, 110*d*, 200*a* or 200*b*).

Referring to FIG. 6, in step 601, the device obtains QoS mapping information between different systems. The QoS mapping information may include at least one of information notifying that switching between parameters indicating the QoS required for communication in a first system and a second system is allowed, information indicating correspondence between the parameters indicating the QoS required for the communication in the first system and the second system, and information indicating a switching rule between the parameters indicating the QoS required for the communication in the first system and the second system. For example, one of the first system and the second system may be a system based on the LTE standard as shown in FIG. 1, and the other may be a system based on the NR standard as shown in FIG. 2. The QoS mapping information may be obtained through a unique procedure for providing the mapping information, or a procedure for other purpose (e.g., a procedure for registering in the network, a procedure for accessing the network or a procedure for updating a tracking area (TA)).

In step 603, the device performs an operation related to direct communication using the mapping information. For example, the device may switch the QoS parameters of the first system to the QoS parameters of the second system using the mapping information. The switched QoS parameters may be used for various operations related to the direct communication. For example, the switched QoS parameters may be used for resource allocation, resource request, service availability determination, and so on.

As in the embodiment described with reference to FIG. 6, the device may obtain the QoS mapping information between the first system and the second system. In this regard, the device may transmit to the network, capability information notifying that direct communication related operations based on the QoS mapping information may be performed. In other words, since providing the mapping information to the device even though the mapping information is unavailable causes unnecessary signaling overhead, the device may inform the network of the necessity of the mapping information by transmitting the capability information reporting that the mapping information is available.

As in the embodiment described with reference to FIG. 6, the device may switch the QoS parameters of the first system to the QoS parameters of the second system.

According to an embodiment, if the device is a base station, the device may receive from the terminal a message requesting resource allocation for the direct communication, and switch the QoS parameters of the first system included in the message to the QoS parameters of the second system. For example, the device may select a system adequate for the direct communication based on link status of the first system and the second system, and switch the QoS parameters for the resource allocation according to the selection.

According to another embodiment, if the device is a UE, the device may switch the QoS parameters of the first system generated by an application to the QoS parameters of the second system. As an example, to perform the direction communication in other system than a system corresponding to the QoS parameters provided by the application, the device may switch the QoS parameters generated by the application. As another example, if a system used to provide a service of each application is defined but the QoS parameters provided by the application do not correspond to the defined system, the device may switch the QoS parameters generated by the application.

Figure 7:
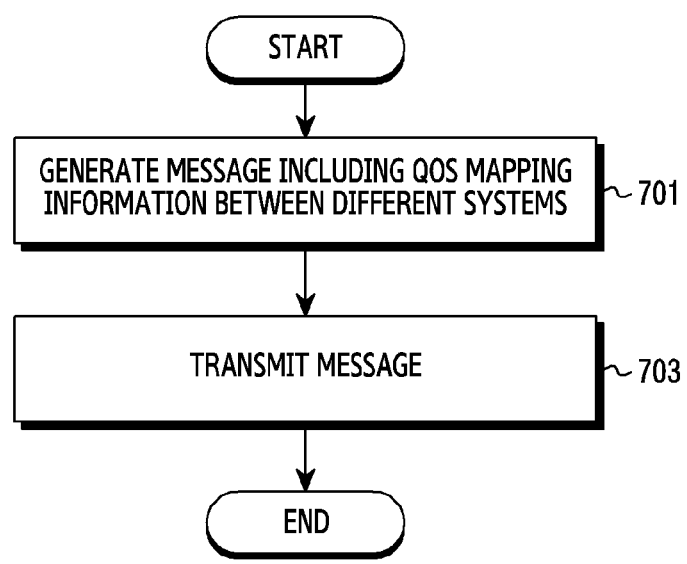
FIG. 7 illustrates a flowchart for providing mapping information of service quality in a wireless communication system according to an embodiment of the present disclosure.

FIG. 7 is a flowchart for providing mapping information of QoS in a wireless communication system according to an embodiment of the present disclosure. FIG. 7 illustrates an operating method of a device for providing the QoS mapping information. For example, the device may be a core network entity (e.g., the HSS 135, the MME 125, the V2X CF 140, the S/P-GW 130, the UDR 230, the PCF 240, or the AMF 215) or a base station (e.g., the eNB 120 or the gNB 210).

Referring to FIG. 7, in step 701, the device generates a message including QoS mapping information between different systems. The QoS mapping information may include at least one of information notifying that switching between parameters indicating the QoS required for communication in a first system and a second system is allowed, information indicating correspondence between the parameters indicating the QoS required for the communication in the first system and the second system, and information indicating a switching rule between the parameters indicating the QoS required for the communication in the first system and the second system. For example, one of the first system and the second system may be a system based on the LTE standard as shown in FIG. 1, and the other may be a system based on the NR standard as shown in FIG. 2. The message including the QoS mapping information may be generated by a request of other device, or may be generated by determination of the device.

In step 703, the device transmits the message including the QoS mapping information. The message including the QoS mapping information may be transmitted through a unique procedure for providing the mapping information, or a procedure for other purpose (e.g., a procedure for registering in a network, a procedure for accessing a network or a procedure for updating a TA).

According to various embodiments, an operating method of a base station in a wireless communication system may include obtaining information of QoS mapping related to direct communication between a first system and a second system, and switching between QoS of the first system and QoS of the second system using the mapping information.

In some embodiments, obtaining the mapping information may include transmitting a first message for registration of a terminal to a higher network entity, receiving a second message as a response to the first message, and obtaining the mapping information from the second message.

In some embodiments, the method further includes receiving a first message requesting a resource for direct communication from the terminal, and transmitting a second message notifying a result of the resource allocation, and the second message may be generated based on QoS parameters related to the direct communication included in the first message and the mapping information.

In some embodiments, the method further includes transmitting a first message for establishing connection with a network to a higher network entity, and receiving a second message which is a response to the first message from the higher network entity, and the first message may include capability information of the base station related to the QoS mapping.

In some embodiments, the capability information may include information indicating presence or absence of cross-radio access technology (RAT) PC5 control capability.

In some embodiments, an operating method of a terminal in a wireless communication system may include obtaining information of QoS mapping related to direct communication between a first system and a second system, and switching between QoS of the first system and QoS of the second system using the mapping information.

In some embodiments, the method further includes transmitting a first message requesting resources for direct communication to a base station, and receiving a second message notifying a result of the resource allocation, and the first message may include QoS parameters of the first system or the second system.

In some embodiments, the first message may indicate whether the resources requested based on at least one of a message type, an indication, a destination address value, and the QoS parameters included in the first message are first system resources or second system resources.

According to various embodiments, a base station apparatus in a wireless communication system includes at least one transceiver, and at least one processor connected to the at least one transceiver, and the at least one processor may control to obtain mapping information of QoS related to direct communication between a first system and a second system, and to perform switching between QoS of the first system and QoS of the second system using the mapping information.

In some embodiments, the at least one processor may control to transmit a first message for registration of a terminal to a higher network entity, receive a second message as a response to the first message, and obtain the mapping information from the second message.

In some embodiments, the at least one processor controls to receive a first message requesting resources for direct communication from the terminal, and to transmit a second message informing an allocation result of the resource, and the second message may be generated based on the QoS parameters related to the direct communication included in the first message and the mapping information.

In some embodiments, the at least one processor controls to transmit a first message for establishing connection with a network to a higher network entity, and to receive a second message which is a response to the first message from the higher network entity, and the first message may include capability information of the base station related to the QoS mapping.

In some embodiments, the capability information may include information indicating presence or absence of cross-RAT PC5 control capability.

In some embodiments, a terminal apparatus in a wireless communication system includes a transceiver, and at least one processor connected to the transceiver, and the at least one processor may control to obtain information of QoS mapping related to direct communication between a first system and a second system, and to perform switching between QoS of the first system and QoS of the second system by using the mapping information.

In some embodiments, the at least one processor controls to transmit a first message requesting resources for the direct communication to the base station, and to receive a second message informing an allocation result of the resource, and the first message may include QoS parameters of the first system or the second system.

In some embodiments, the first message may indicate whether resources requested based on at least one of a message type, an indication, a destination address value, and the QoS parameters included in the first message are first system resources or second system resources.

Hereinafter, the present disclosure describes specific examples of providing, obtaining, and using mapping information of QoS parameters between different systems. In the following descriptions, messages with specific names are mentioned, which are for convenience of descriptions, and do not limit the present invention.

Figure 8A:
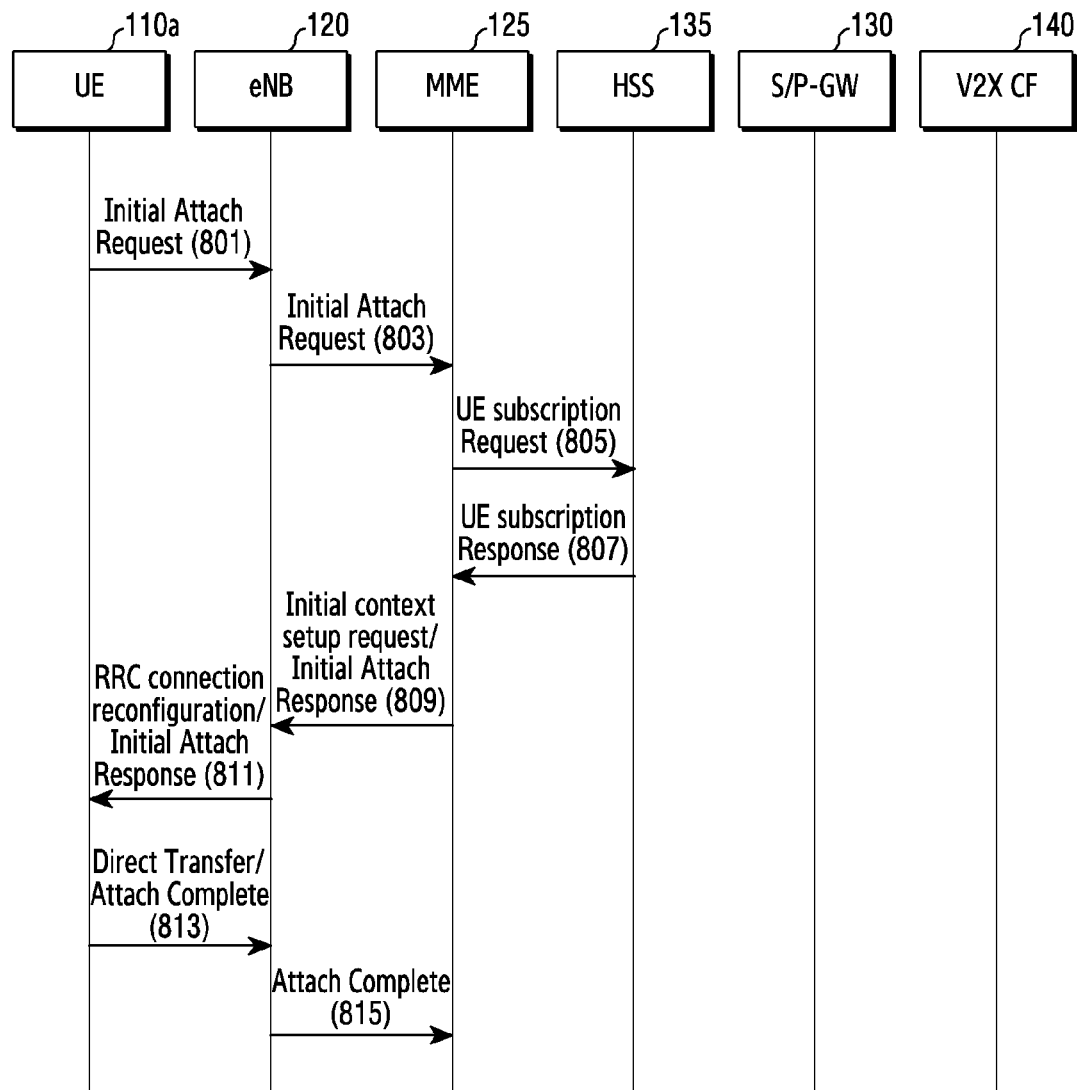
FIG. 8A illustrates a procedure for a base station to obtain service policy/parameter information from a network of a first communication system during an initial registration process in a wireless communication system according to an embodiment of the present disclosure.

FIG. 8A illustrates a procedure for a base station to obtain service policy/parameter information from a network of a first communication system during an initial registration process in a wireless communication system according to an embodiment of the present disclosure. The procedure illustrated in FIG. 8A is a procedure in which the UE 110a registers at the network, and the registration procedure may be referred to as network attachment. A default EPS bearer is created during the network attachment, and thus always-on IP connectivity is possible.

According to FIG. 8A, in step 801, the UE 110a may transmit an initial attach request message to the eNB 120. The UE 110a may transmit the attach request message to the eNB 120 using a radio resource control (RRC) connection setup complete message.

In step 803, the eNB 120 may transmit the initial attach request message to the MME 125 to access. The eNB 120 may transmit the attach request message using an initial UE message which is an S1-MME control message. The initial attach request message may include UE capability information supported by the UE 110a. The UE capability information may include at least one of V2X capability indication, LTE PC5 capability, and NR PC5 capability. The initial attach request message may be included in an S1 application protocol (S1AP) initial UE message and delivered to the MME 125. The eNB 120 may deliver the initial UE message including V2X support capability information of the eNB 120, for example, V2X support, cross-RAT PC5 control capability information to the MME 125. According to another embodiment, a tracking area update (TAU) message may be used, in place of the initial attach request message.

In step 805, the MME 125 may transmit a message requesting subscription information of the UE 110a (e.g., a UE subscription request message) to the HSS 135. In step 807, the HSS 135 may response to the MME 125 a response message (e.g., a UE subscription response message) including the UE subscription information. The subscription information of the UE 110a may include at least one of the items shown in <Table 1>. According to an embodiment of the present disclosure, the HSS 135 may store the V2X service policy and parameter information for the direct communication (e.g., ProSe) shown in <Table 2>. The subscription information responded by the HSS 135 to the MME 125 may include at least some of the V2X service policy and parameter information for the direct communication (e.g., ProSe) shown in <Table 2>.

Next, in step 809, the MME 125 may transmit to the eNB 120 an S1AP initial context setup request message including an attach accept message or a TAU accept message. The MME 125 may determine information included in the initial context setup request message and provided to the eNB 120 based on the UE capability and eNB capability (RAN capability) information received in step 803.

According to an embodiment, if the UE capability includes V2X capability indication and the eNB capability includes V2X support, the initial context setup request message may include at least one of the V2X service authorized indication (e.g., a of Table 1) and UE-PC5-aggregated maximum bit rate (AMBR) for LTE PC5 (e.g., b of Table 1).

According to another embodiment, if the UE capability includes the V2X capability indication and the NR PC5 capability, and the eNB capability includes the V2X support and the cross-RAT PC5 control, the initial context setup request message may include at least one of V2X service authorized indication (e.g., a of <Table 1>), UE-PC5-AMBR for LTE PC5 (e.g., b of Table 1), UE-PC5-AMBR for NR PC5 (e.g., c of <Table 1>), cross-RAT PC5 control authorization (e.g., e of <Table 1>), and V2X service policy and parameter information for direct communication (e.g., ProSe) (e.g., at least one of the items of <Table 2>).

In step 811, the eNB 120 transmits an RRC connection reconfiguration message including the attach accept message to the UE 110a. Next, although not depicted in FIG. 8A, the UE 110a transmits an RRC connection reconfiguration complete message to the eNB 120, and the eNB 120 transmits an initial context setup response message to the new MME 125. Next, in step 813, the UE 110a transmits a direct transfer message including the attach complete message to the eNB 120. In step 815, the eNB 120 delivers the attach complete message to the new MME 125.

Figure 8B:
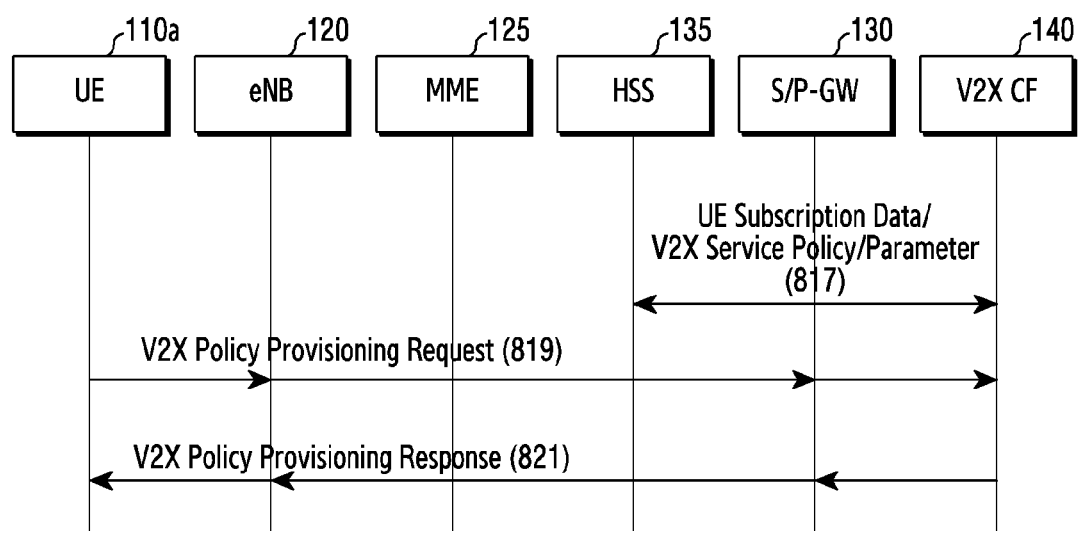
FIG. 8B illustrates a procedure for a terminal to obtain the service policy and parameter information from the network of the first communication system in the wireless communication system according to an embodiment of the present disclosure.

FIG. 8B illustrates a procedure for the terminal to obtain the service policy and parameter information from the network of the first communication system in the wireless communication system according to an embodiment of the present disclosure. FIG. 8B illustrates the procedure for the terminal to obtain V2X service policy and parameter information. According to the procedure shown in FIG. 8B, after completing the registration at the network through the procedure shown in FIG. 8A, the UE 110a may establish PDN connection with the V2X CF 140 through the eNB 120 and the S/P-GW 130, and obtain the V2X service policy and parameter information from the V2X CF 140.

Referring to FIG. 8B, in step 817, the HSS 135 may receive V2X related subscription information and service policy/parameter information from the V2X CF 140. In step

819, the UE 110*a* may transmit a V2X policy provisioning request message to the V2X CF 140. The V2X policy provisioning request message may include UE capability (e.g., LTE PC5 capability, NR PC5 capability, etc.). In step 821, the V2X CF 140 receiving the V2X policy provisioning request message may reply with a V2X policy provisioning response message. The V2X policy provisioning response message may include at least some of the V2X service policy and parameter information shown in <Table 2> and <Table 3>.

In the embodiment described with reference to FIG. 8B, the HSS 135 and the V2X CF 140 may exchange UE subscription information and service policy/parameter information related to the V2X, in step 817. Referring to FIG. 8A and FIG. 8B, step 817 is performed after the network registration of the UE 110*a*. However, according to another embodiment, step 817 may be performed before the network registration of the UE 110*a*, that is, before step 801. In addition, if there is a change in the UE subscription information and the service policy/parameter information related to the V2X, the HSS 135 or the V2X CF 140 may update the information by triggering step 817.

Figure 9A:
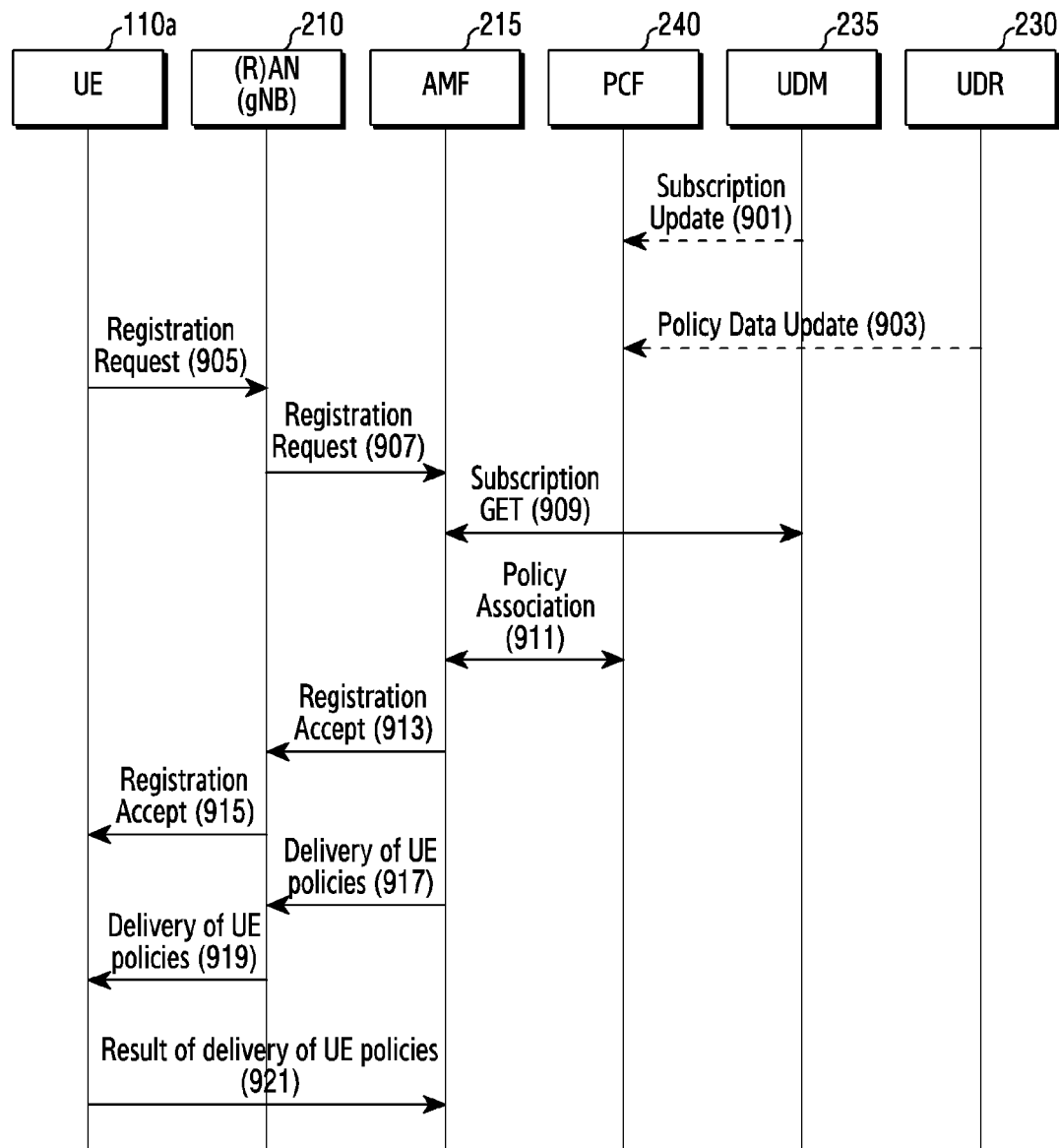
FIG. 9A illustrates a procedure for a terminal and a base station to obtain service policy/parameter information from a network of a second communication system during an initial registration process in a wireless communication system according to an embodiment of the present disclosure.
Figure 9B:
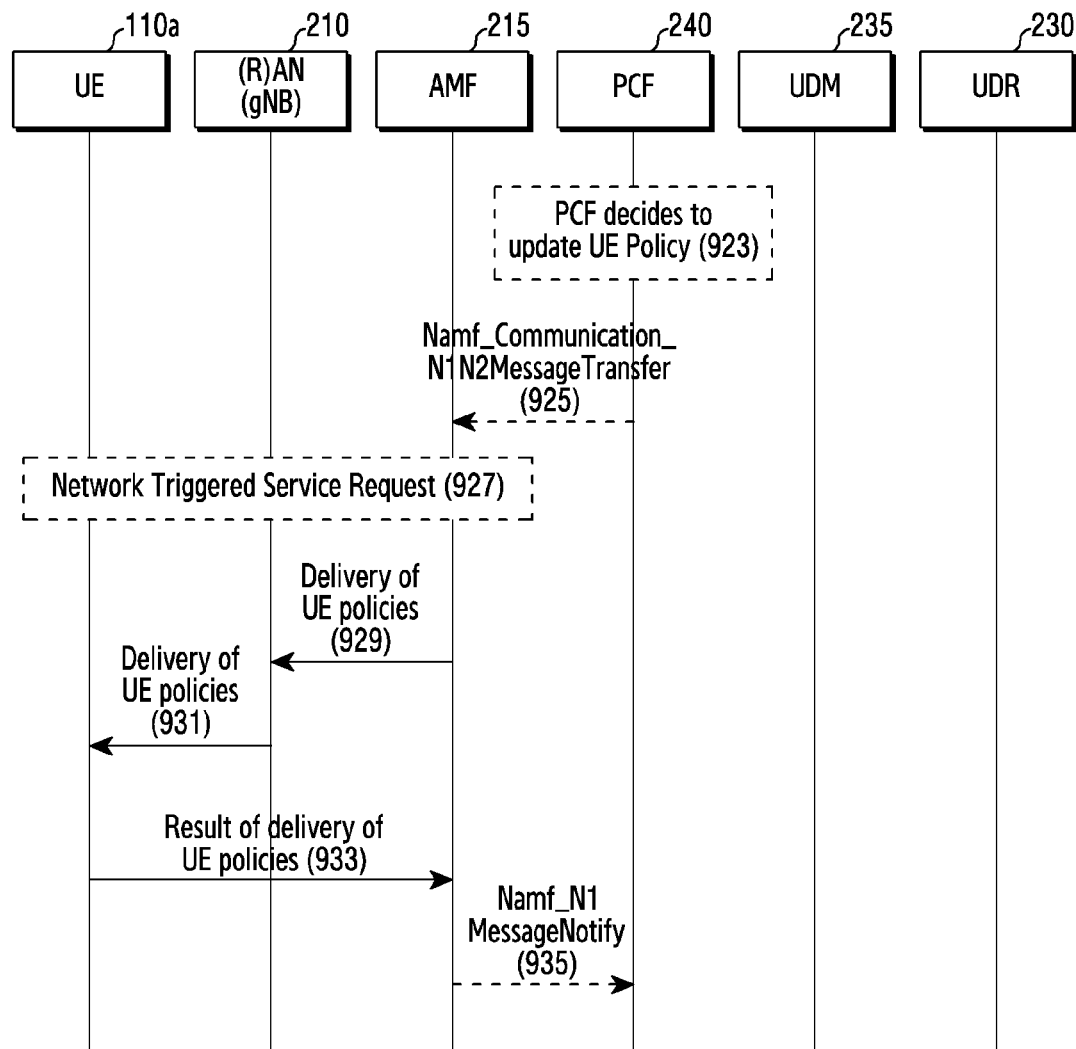
FIG. 9B illustrates a procedure for the terminal to obtain the service policy/parameter information from the network at a network request from the second communication system in the wireless communication system according to an embodiment of the present disclosure.
Figure 9C:
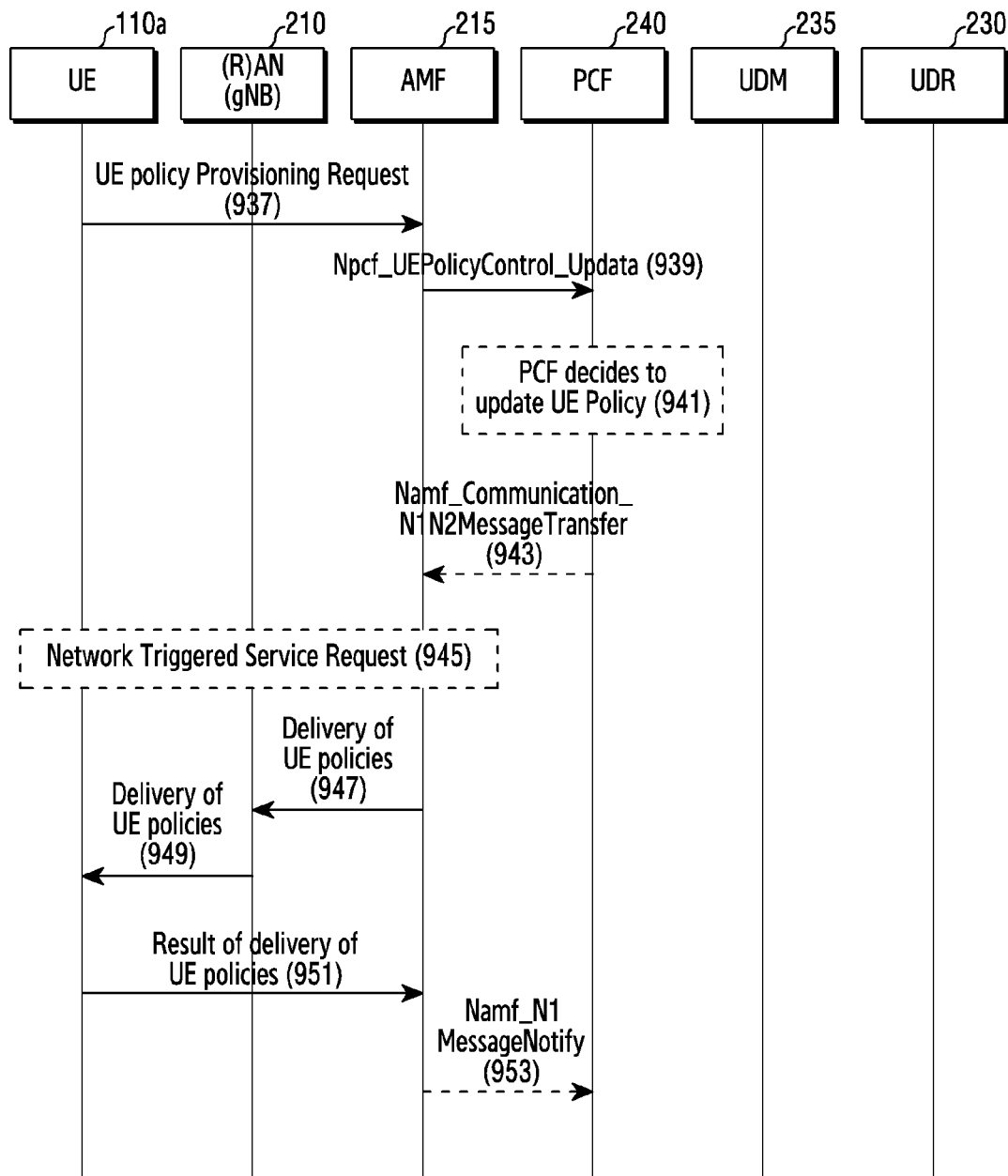
FIG. 9C illustrates a procedure for the terminal to obtain the service policy/parameter information from the network of the second communication system at a terminal request in the wireless communication system according to an embodiment of the present disclosure.

FIG. 9A through FIG. 9C illustrate a procedure for a terminal to obtain service policy/parameter information (e.g., the V2X service policy parameters shown in <Table 1>) from a network according to an embodiment of the present disclosure.

FIG. 9A illustrates a procedure for a terminal and a base station to obtain service policy/parameter information from a network of a second communication system during an initial registration process in a wireless communication system according to an embodiment of the present disclosure. FIG. 9A illustrates signaling between the UE 110*a*, the gNB 210, the AMF 215, the PCF 240, the UDM 235, and the UDR 230. Herein, the gNB 210 may be referred to as an 'access network (An)' or a 'RAN'.

Referring to FIG. 9A, in step 901, the UDM 235 may transmit subscription information of the UE 110*a* to the PCF 240. For example, if the subscription information of the UE 110*a* stored in the UDM 235 is updated, the UDM 235 may provide the updated subscription information. In step 903, the UDR 230 may transmit policy related information (e.g., V2X service parameters) to the PCF 240. For example, if the policy related information stored in the UDR 230 is updated, the UDR 230 may provide the updated policy related information. In FIG. 9A, it is shown that step 901 and step 903 are performed prior to subsequent steps. However, according to another embodiment, at least one of step 901 and step 903 may be omitted, or may be performed at different times. That is, step 901 and step 903 may be performed independently from the registration procedure of the UE 110*a*.

In step 905, the UE 110*a* may transmit a registration request message to the gNB 210. In step 907, the gNB 210 may transmit the registration request message to the AMF 215. The AMF 215 receiving the registration request message from UE 110*a* via the gNB 210 may request UE subscription information of the UE 110*a* from the UDM 235 through signaling with the UDM 235, and obtain the subscription information from the UDM 235, in step 909. In step 911, the AMF 215 may request policy information related to the UE 110*a* from the PCF 240 through signaling with the PCF 240, and obtain the policy information.

In step 905, the UE 110*a* may include UE capability information supported by the UE 110*a* and/or UE policy container (e.g., V2X policy) information in the registration request message and thus transmit the capability information and/or the UE policy container information to the gNB 210. The gNB 210 may deliver the registration request message received from the UE 110*a* to the AMF 215. At this time, if the UE 110*a* supports the V2X service, information indicating that the UE 110*a* supports the V2X service may be provided to the AMF 215 by being included in the UE capability information (e.g., V2X capability indication). In addition, information indicating that the UE 110*a* supports PC5 communication may be provided to the AMF 215 by being included in UE LTE PC5 capability and UE NR PC5 capability information.

The registration request message transmitted in step 907 may be delivered to the AMF 215 by being included in a next generation application protocol (NGAP) initial UE message transmitted by the gNB 210 to the AMF 215. The gNB 210 may include gNB 210 support capability information, for example, V2X support and cross-RAT PC5 control in the initial UE message.

In step 909, the AMF 215 may request subscription information of the UE 105*a* from the UDM 235, and the UDM 235 may transmit a message requesting the subscription information to the UDR 230. The message for requesting the subscription information of the UE 110*a* may include identification information indicating the UE 110*a* (e.g., subscriber permanent identifier (SUPI) of the UE 110*a*, 5G-globally unique temporary identifier (GUTI), international mobile subscriber identity (IMSI), etc.)). The UDR 230 may reply to the UDM 235 with a DM query response message including the subscription information of the UE 110*a*. The UDM 235 receiving the UE subscription information may reply to the AMF 215 with a UE subscription response message. The UE subscription response message may include at least one of the UE subscription information for the V2X service shown in <Table 1> (e.g., V2X service authorized information of the UE 110*a*, V2X capability of the UE 110*a*, PC5 LTE capability of the UE 110*a*, PC5 NR capability of the UE 110*a*, cross-RAT PC5 control authorized information of the UE 110*a*, etc.).

According to an embodiment, if the AMF 215 determines that the UE 110*a* supports the V2X service based on the UE capability information received from the UE 110*a*, the AMF 215 may select the PCF 240 supporting the V2X service. In step 911, the AMF 215 may request policy information related to the UE 110*a* from the selected PCF 240. The message transmitted in step 911 may include UE policy container (e.g., V2X policy) information received from the UE 110*a* by the AMF 215.

The PCF 240 may obtain V2X service parameters to be applied to the UE 110*a* from the UDR 230 using one of various methods. For example, in step 903, if the V2X service parameter update is needed, the UDR 230 may provide the V2X service parameters to the PCF 240. As another example, in step 911, the PCF 240 may request and obtain the V2X service parameters from the UDR 230. According to an embodiment, the V2X service parameters provided by the UDR 230 to the PCF 240 may include the V2X service policy and parameter information shown in <Table 2> and <Table 3>.

Meanwhile, the PCF 240 may receive the subscriber information of the UE 110*a* and information of functionality or capability supported by the UE 110*a* in step 911. That is, the AMF 215 may provide the UE capability information and/or the UE subscription information obtained from the UDM 235 to the PCF 240 in step 911.

In step 911, the PCF 240 provides the policy information to be applied to the UE 110*a* to the AMF 215, wherein the parameters for the V2X service obtained from the UDR 230 may be included in the policy information. If the PCF 240 transmits the parameter policy information for the V2X service to the AMF 215, the PCF 240 may configure a policy container according to the following method.

According to an embodiment, the PCF 240 may include policy/parameter information related to the LTE PC5 among the V2X service policies and parameters for the direct communication (e.g., ProSe) of <Table 2> into one policy container. In addition, the PCF 240 may include policy/parameter information related to the NR PC5 among the V2X service policies and parameters for the direct communication (e.g., ProSe) of <Table 2> into one policy container. In addition, the PCF 240 may include V2X service policy and parameter information for the network communication (e.g., Uu communication) of <Table 3> into one policy container. The PCF 240 may designate a policy section ID indicating the V2X service policy and parameter information to the V2X policy, and include it in the policy container. The PCF 240 may notify that the corresponding policy information is the policy for the V2X through the policy section ID, and that the V2X service policy and parameter information is included.

In step 913 and step 915, the AMF 215 may deliver a registration accept message including the parameter information for the V2X service obtained from the PCF 240 to the UE 110*a* via the gNB 210. At this time, the AMF 215 may determine information to be provided to the gNB 210 using the registration accept message included in the NGAP initial context setup message and information to be provided to the UE 110*a* by using and including the registration accept message based on the UE capability and the RAN capability information received in step 907.

According to an embodiment, if the UE capability includes the V2X capability indication and the NR PC5 capability, and the gNB capability includes the V2X support, the registration accept message transmitted in step 913 may include at least one of V2X service authorized indication (e.g., a of <Table 1>), UE-PC5-AMBR for NR PC5 (e.g., c of <Table 1>), PLMN list for the UE 110*a* to use the PC5 communication (e.g., d of <Table 1>), cross-RAT PC5 control authorization (e.g., e of <Table 1>), and policy container including the policy/parameter information related to the NR PC5 among the V2X service policies and parameters for the direct communication (e.g., ProSe) of <Table 2>.

According to an embodiment, if the UE capability includes V2X capability indication, LTE PC5 capability, and NR PC5 capability, and the gNB capability includes V2X support and cross-RAT PC5 control, the registration accept transmitted in step 913 may include at least one of V2X service authorized indication (e.g., a of <Table 1>), UE-PC5-AMBR for LTE PC5 (e.g., b of <Table 1>), UE-PC5-AMBR for NR PC5 (e.g., c of <Table 1>), PLMN list for the UE 110*a* to use the PC5 communication (e.g., d of <Table 1>), cross-RAT PC5 control authorization (e.g., e of <Table 1>), policy container including policy/parameter information related to the LTE PC5 among the V2X service policies and parameters for the direct communication (e.g., ProSe) of <Table 2>, and policy container including policy/parameter information related to the NR PC5 among the V2X service policies and parameters for the direct communication (e.g.: ProSe) of <Table 2>.

Alternatively, in step 917 and step 919, the AMF 215 may deliver the parameter information for the V2X service received from the PCF 240 to the UE 110*a* through a separate procedure. The parameter information for providing the V2X service included in the registration accept message transmitted in step 913 and step 915 or the UE policy delivery message transmitted in step 917 and step 919 may include at least one of the service policy/parameter information described in the present disclosure. At this time, in step 917 and step 919, the parameter information for the V2X service included in a NGAP downlink non-access stratum (NAS) transport message and a NAS message for the AMF 215 to provide the policy information to the terminal may be determined in a similar manner to step 913 and step 915. In step 917, the AMF 215 may deliver a NGAP UE context modification request message to the gNB 210. The NGAP UE context modification request message is a message used to change the context information of the terminal configured in the gNB 210, and the gNB 210 stores and applies the parameter information for the V2X service received through the NGAP UE context modification request message in the context of the terminal. In response to this, the gNB 210 may transmit a UE context modification response message to the AMF 215, and thus notify that the context of the terminal is changed and applied according to the received information.

FIG. 9B illustrates a procedure for the terminal to obtain the service policy/parameter information from the network at a network request of the second communication system in the wireless communication system according to an embodiment of the present disclosure. FIG. 9B is an example of another procedure for the UE 110*a* to obtain the service policy/parameter information (e.g., the V2X service policy parameters shown in <Table 1>). According to the embodiment of FIG. 9B, the UE 110*a* may obtain UE policy related information using a UE configuration update procedure.

Referring to FIG. 9B, in step 923, the PCF 240 may determine to update the UE policy. The PCF 240 may receive and store the updated service policy/parameter information (e.g., the V2X service policy parameters shown in <Table 1>) of the terminal from the UDR 230 as in step 903 of FIG. 9A as described above. At this time, the PCF 240 may determine whether the update of the UE policy is needed during the initial registration procedure (e.g., the procedure of FIG. 9A) of the UE 110*a*, or determine whether the update of the UE policy is needed by the network being triggered that the UE policy is needed after the initial registration. For example, during the initial registration procedure, the PCF 240 may determine whether the UE policy update is required based on the UE policy container (e.g., V2X policy) information received from the AMF 215, and information associated with access selection and PDU selection of the terminal (e.g., may be included in Npcf_UEPolicyControl_Create request). Alternatively, if there occurs an even such as changing the location of the UE 110*a* or changing the subscription information of the UE 110*a*, for example, a slice service to which the UE 110*a* is subscribed (subscribed single-network slice selection assistance information (S-NSSAI)), the PCF 240 may determine whether the UE policy needs to be changed. In addition, as described in the section related to step 911 of FIG. 9A, the PCF 240 may determine to deliver the service policy/parameter information (e.g., the V2X service policy parameters shown in <Table 1>) received from the UDR 230 to the UE 110*a*.

In step 925, the PCF 240 may transmit the service policy/parameter information (e.g., the V2X service policy parameters shown in <Table 1>) to the AMF 215. At this time, if the V2X service policy parameters shown in <Table 1> are transmitted as the service policy/parameter information, the service policy/parameter information may include at least part of the V2X service parameters shown in <Table 1>. According to an embodiment, the service policy/parameter information (e.g., the V2X service policy parameters shown in <Table 1>) may be transmitted to the AMF 215 by being included in the Namf_Communication_N1N2MessageTransfer message. The Namf_Communication_N1N2MessageTransfer message may include the SUFI, the UE policy container, and the like.

In step 927, if the UE 110*a* is registered in the network and is in a state for being serviced, the AMF 215 may determine to deliver the UE policy received from the PCF 240 to the UE 110*a*. If the UE 110*a* is registered in any one of 3GPP and non-3GPP access, the AMF 215 may deliver the UE policy to the UE 110*a* through the access connected by registering the UE 110*a*. If the UE 110*a* is registered at both of the 3GPP and the non-3GPP access and is connectable, the AMF 215 may select a specific access according to AMF 215 local policy, and deliver the UE policy the UE 110*a*. If the UE 110*a* is not registered in or is not connectable to either the 3GPP or the non-3GPP access, in step 935, the AMF 215 may notify UE policy transmission failure to the PCF 240 through a specific message (e.g., Namf_Communication_N1N2TransferFailureNotification). If the AMF 215 determines to deliver the UE policy to the UE 110*a* through the 3GPP access, if the UE 110*a* is in a CM-IDLE state, the AMF 215 may transmit a paging message to the UE 110*a* and thus initiate a paging procedure by a network triggered service request. The UE 11*a* receiving the paging request message may perform the paging procedure.

In step 929 and step 931, the AMF 215 may deliver the UE policy to the UE 110*a*. In this case, if the UE policy includes the V2X service, the UE policy may include at least one of the V2X service policy parameters shown in <Table 1>. In this case, the AMF 215 may deliver a NAS message (e.g., a downlink NAS message or a MANAGE UE POLICY COMMAND message) for providing the policy to the UE to deliver the parameter. For doing so, the AMF 215 may include the NAS message in an NGAP downlink NAS transport or a NGAP UE context modification request message transmitted to the gNB 210. The parameter information for the V2X service provided by the AMF 215 in step 929 and step 931 may be determined in a similar manner to step 913 and step 915. If the AMF 215 delivers the NGAP UE context modification request message to the gNB 210, the gNB 210 may store and apply the parameter information for the V2X service received through the NGAP UE context modification request message in the context of the terminal. The gNB 210 may transmit a UE context modification response message to the AMF 215 as a response thereto, and thus inform that the context of the terminal is changed and applied according to the received information.

In step 933, the UE 110*a* receiving the information of the UE policy may store the obtained information, and transmit a reply message informing that the corresponding information is received to the AMF 215. In step 935, the AMF 215 may inform the PCF 240 that the service policy/parameter information (e.g., the V2X service policy parameters illustrated in <Table 1>) is transmitted to the UE 110*a*. In this case, the message transmitted in step 935 may be a Namf_N1MessageNotify message. In addition, the PCF 240 may maintain the UE policy, and inform the UDR 230 of the updated UE policy.

FIG. 9C illustrates a procedure for the terminal to obtain the service policy/parameter information from the network of the second communication system at a UE request in the wireless communication system according to an embodiment of the present disclosure. FIG. 9C is an example of yet another procedure for the UE 110*a* to obtain the service policy/parameter information (e.g., the V2X service policy parameters shown in <Table 1>). According to the embodiment of FIG. 9C, the UE 110*a* may obtain the UE policy by triggering the UE policy acquisition.

Referring to FIG. 9C, in step 937, the UE 110*a* may transmit a message requesting the UE policy to the AMF 215. In this case, the message requesting the UE policy may be a UE policy provisioning request message, and may include a UE policy container (e.g., the V2X policy).

In step 939, the AMF 215 may transmit a message requesting UE policy information to the PCF 240. The message requesting the UE policy information may be a Npcf_UEPolicyControl_Update request, and may include the UE policy container (e.g., the V2X policy) received from the terminal.

In step 941, the PCF 240 receiving the message requesting the UE policy information may determine whether the UE policy update is necessary. Subsequent step 941, step 943, step 945, step 947, step 949, step 951, and step 953 may be performed similarly to the operations described with reference to FIG. 9B. For example, the PCF 240 may transmit the UE policy information to the AMF 215 in step 943, and the AMF 215 may determine to deliver the UE policy to the UE 110*a* and deliver it in step 945, step 947, and step 949. In response to the UE policy, the UE 110*a* may transmit a response message to the AMF 215 in step 951, and the AMF 215 may transmit a message indicating whether the UE policy transmission is successful or not to the PCF 240 in step 953.

The procedures for obtaining the service parameter/policy described with reference to FIG. 9A, FIG. 9B, and FIG. 9C may be equally applied to the other terminals (e.g., the UE 110*b*, the UE 110*c*, the UE 110*d*, the UE 200*a*, and the UE 200*b*).

Figure 10:
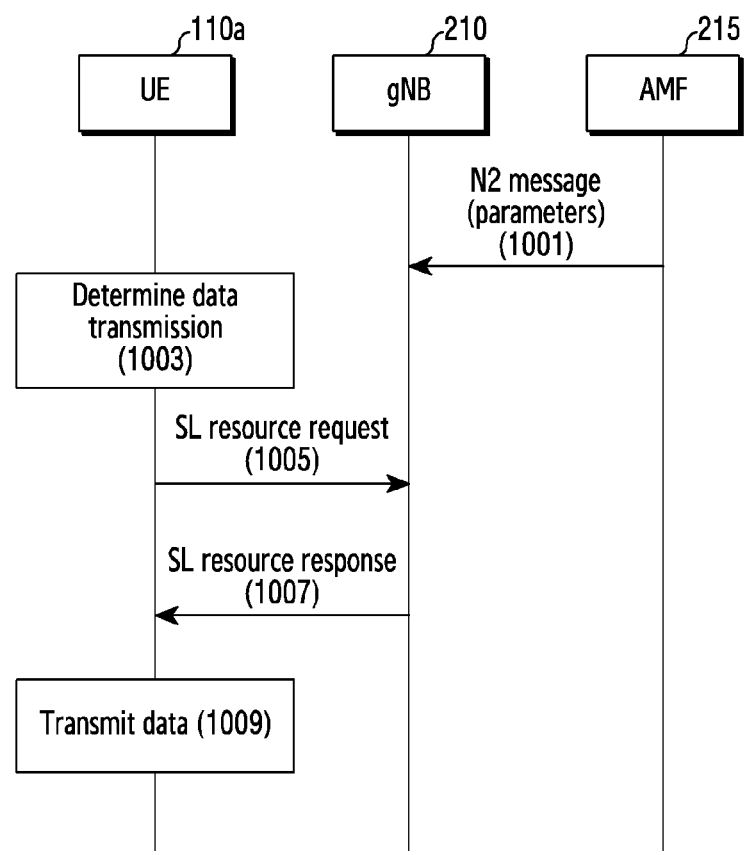
FIG. 10 illustrates a procedure for a terminal to request and obtain a radio resource for direct communication from a network entity of a second communication system in a wireless communication system according to an embodiment of the present disclosure.

FIG. 10 illustrates a procedure for a terminal to request and obtain radio resources for direct communication from a network entity of a second communication system in a wireless communication system according to an embodiment of the present disclosure.

Referring to FIG. 10, in step 1001, the base station 210 may obtain V2X service subscription information, policy and parameter information from the AMF 215. For example, the base station 210 may obtain the V2X service subscription information, and the policy and parameter information as in step 913 of FIG. 9A, step 917 of FIG. 9A, or step 929 of FIG. 9B.

In step 1003, the UE 110*a* may determine to transmit data using the LTE PC5. In step 1005, the UE 110*a* may transmit a sidelink (SL) resource request message for requesting LTE PC5 resources to the base station 210. The SL resource request message may include at least one of a PPPP (and/or PPPR) requested by the data to be transmitted by the UE 110*a*, a destination address of the data to be transmitted by the UE 110*a* (e.g., Destination Layer-2 ID), and PQI required by the data to be transmitted by the UE 110*a*, and a QoS flow identifier (QFI) indicating the PQI.

According to the request of the UE 110*a*, the base station 210 determines radio resources to be allocated to the UE 110*a*. To determine the radio resources to be allocated to the UE 110*a*, the base station 210 may use QoS mapping information (e.g., 'the mapping of PPPP and 5QI' and/or 'the mapping of PPPR and 5QI'). For example, if receiving the PQI from the UE 110*a* in step 1005, the base station 210 may convert the PQI received from the UE 110*a* to the PPPP (and/or PPPR) value using the QoS mapping information, and determine the radio resources to be assigned to the UE 110a. Alternatively, if receiving the PPPP (and/or PPPR) from the UE 110a in step 1005, the base station 210 may convert the PPPP (and/or PPPR) received from the UE 110a to a PQI value using the QoS mapping information, and determine the radio resources to be assigned to the UE 110a. Herein, the QoS mapping information may be obtained from the AMF 215 according to step 913 of FIG. 9A, step 917 of FIG. 9A, and step 929 of FIG. 9B. Alternatively, the QoS mapping information may be pre-configured in the base station 210, and the base station 210 may use the pre-configured information.

In step 1007, the base station 210 may transmit an SL resource response message including radio resource information allocated to the UE 110a. Herein, the radio resource may include at least one of a resource allocated exclusively to the UE 110a or a resource competitively used with other UE. In step 1009, the UE 110a may transmit data. The UE 110a may transmit the data by using at least part of the radio resources allocated by the base station 210.

In the embodiment described with reference to FIG. 10, the UE 110a determines to use the LTE PC5. According to another embodiment, the NR PC5, rather than the LTE PC5, may be used. In this case, each step of FIG. 10 includes the following operations.

In step 1003, the UE 110a may determine to transmit data using the NR PC5. Next, in step 1005, the UE 110a may transmit an SL resource request message for requesting NR PC5 resources to the base station 210. The SL resource request message may include at least one of a PPPP (and/or PPPR) requested by the data to be transmitted by the UE 110a, a destination address of the data to be transmitted by the UE 110a (e.g., Destination Layer-2 ID), and PQI required by the data to be transmitted by the UE 110a, and QFI indicating the PQI.

According to the request of the UE 110a, the base station 210 determines radio resources to be allocated to the UE 110a. To determine the radio resources to be allocated to the UE 110a, the base station 210 may use QoS mapping information (e.g., 'the mapping of PPPP and 5QI' and/or 'the mapping of PPPR and 5QI'). For example, if receiving the PQI from the UE 110a in step 1005, the base station 210 may convert the PQI received from the UE 110a to a PPPP (and/or PPPR) value using the QoS mapping information, and determine the radio resources to be allocated to the UE 110a. Alternatively, if receiving the PPPP (and/or PPPR) from the UE 110a in step 1005, the base station 210 may convert the PPPP (and/or PPPR) received from the UE 110a to a PQI value using the QoS mapping information, and determine the radio resources to be allocated to the UE 110a. Herein, the QoS mapping information may be obtained from the AMF 215 according to step 913 of FIG. 9A, step 917 of FIG. 9A, and step 929 of FIG. 9B. Alternatively, the QoS mapping information may be pre-configured in the base station 210, and the base station 210 may use the pre-configured information.

In step 1007, the base station 210 may transmit an SL resource response message to the UE 110a. The SL resource response message may include information of the radio resources allocated to the UE 110a. Herein, the radio resource may include at least one of a resource exclusively allocated to the UE 110a or a resource competitively used with other UE. In step 1009, the UE 110a may transmit data. The UE 110a may transmit the data by using at least part of the radio resources allocated by the base station 210.

In the embodiment described with reference to FIG. 10, the UE 110a may request resources for direct communication from the base station 210. At this time, the UE 110a may selectively request one of the LTE PC5 resource or the NR PC5 resource. Herein, the LTE PC5 resource request and the NR PC5 resource request may be distinguished according to one of various methods.

According to an embodiment, the LTE PC5 resource request and the NR PC5 resource request may be distinguished by being performed by different messages. For example, if the UE 110a requests the PC5 resource from the base station 210, the UE 110a may use different SL resource request messages, to distinguish the LTE PC5 resource request and the NR PC5 resource request. Hence, the base station 210 may determine whether the requested resource is the LTE PC5 resource or the NR PC5 resource, by identifying the type of the SL resource request message.

According to an embodiment, the LTE PC5 resource request and the NR PC5 resource request may be distinguished by an indication in the message. For example, the same SL resource request message is used, but the UE 110a may include the indication indicating one of the LTE PC5 or the NR PC5 in the SL resource request message. Thus, the base station 210 may determine whether the requested resource is the LTE PC5 resource or the NR PC5 resource, by identifying a value of the indication included in the SL resource request message.

According to an embodiment, the LTE PC5 resource request and the NR PC5 resource request may be distinguished using a value of the destination address (e.g., Destination Layer-2 ID) included in the message. For example, values for indicating the destination address may be divided into a first range corresponding to the LTE PC5 resource and a second range corresponding to the NR PC5 resource. Specifically, in using one SL resource request message, the UE 110a may distinguish Destination Layer-2 ID indicating the LTE PC5 and Destination Layer-2 ID indicating the NR PC5 using different values. Hence, the base station 210 may determine whether the requested resource is the LTE PC5 resource or the NR PC5 resource, by identifying the destination address value included in the SL resource request message.

According to an embodiment, the LTE PC5 resource request and the NR PC5 resource request may be distinguished based on the type of the required parameter included in the message. For example, the message requesting the LTE PC5 resource may include a parameter used for the LTE-based direct communication, and the message requesting the 5G PC5 resource may include a parameter used for the 5G-based direct communication. Specifically, if requesting the LTE PC5 resource, the UE 110a may include only the PPPP (and/or PPPR) required by the data in the SL resource request message, and exclude the 5QI required by the data. Similarly, in addition, if requesting the NR PC5 resource, the UE 110a may include only the 5QI required by the data in the SL resource request message, and exclude the PPPP (and/or PPPR) required by the data. Hence, the base station 210 may determine whether the requested resource is the LTE PC5 resource or the NR PC5 resource, by identifying the type of QoS related parameters included in the SL resource request message.

Figure 11:
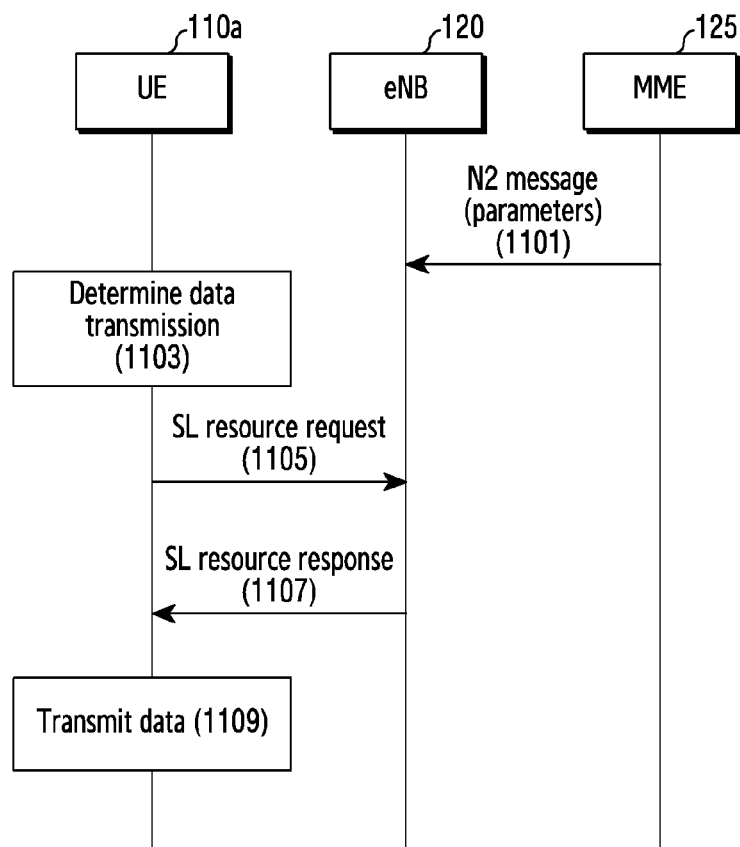
FIG. 11 illustrates a procedure for a terminal to request and obtain a radio resource for direct communication from a network entity of a first communication system in a wireless communication system according to an embodiment of the present disclosure.

FIG. 11 illustrates a procedure for a terminal to request and obtain radio resources for direct communication from a network entity of a first communication system in a wireless communication system according to an embodiment of the present disclosure.

Referring to FIG. 11, in step 1101, the base station 210 may obtain V2X service subscription information, and policy and parameter information from the MME 125. For example, the base station 210 may obtain the V2X service subscription information, and the policy and parameter information as in step 809 of FIG. 8A.

In step 1103, the UE 110*a* may determine to transmit data using the LTE PC5. In step 1105, the UE 110*a* may transmit an SL resource request message for requesting LTE PC5 resources to the base station 120. The SL resource request message may include at least one of a PPPP (and/or PPPR) required by the data to be transmitted by the UE 110*a*, a destination address of the data to be transmitted by the UE 110*a* (e.g., Destination Layer-2 ID), and PQI required by the data to be transmitted by the UE 110*a*, and QFI indicating the PQI.

According to the request of the UE 110*a*, the base station 120 determines radio resources to be allocated to the UE 110*a*. To determine the radio resources to be allocated to the UE 110*a*, the base station 120 may use QoS mapping information (e.g., 'the mapping of PPPP and 5QI' and/or 'the mapping of PPPR and 5QI'). For example, if receiving the PQI from the UE 110*a* in step 1105, the base station 120 may convert the PQI received from the UE 110*a* to a PPPP (and/or PPPR) value using the QoS mapping information, and determine the radio resources to be assigned to the UE 110*a*. Alternatively, if receiving the PPPP (and/or PPPR) from the UE 110*a* in step 1105, the base station 210 may convert the PPPP (and/or PPPR) received from the UE 110*a* to a PQI value using the QoS mapping information, and determine the radio resources to be assigned to the UE 110*a*. Herein, the QoS mapping information may be obtained from the MME 125 according to step 809 of FIG. 8A. Alternatively, the QoS mapping information may be pre-configured in the base station 120, and the base station 120 may use the pre-configured information.

In step 1107, the base station 120 may transmit an SL resource response message. The SL resource response message may include radio resource information allocated to the UE 110*a*. Herein, the radio resource may include at least one of a resource exclusively allocated to the UE 110*a* or a resource competitively used with other UE. In step 1109, the UE 110*a* may transmit data. The UE 110*a* may transmit the data by using at least part of the radio resources allocated by the base station 120.

In the embodiment described with reference to FIG. 11, the UE 110*a* determines to use the LTE PC5. According to another embodiment, the NR PC5, rather than the LTE PC5, may be used. In this case, each step of FIG. 10 includes the following operations.

In step 1103, the UE 110*a* may determine to transmit data using the NR PC5. Next, in step 1105, the UE 110*a* may transmit an SL resource request message for requesting NR PC5 resources to the base station 120. The SL resource request message may include at least one of a PPPP (and/or PPPR) required by the data to be transmitted by the UE 110*a*, a destination address of the data to be transmitted by the UE 110*a* (e.g., Destination Layer-2 ID), and PQI required by the data to be transmitted by the UE 110*a*, and QFI indicating the PQI.

According to the request of the UE 110*a*, the base station 120 determines radio resources to be allocated to the UE 110*a*. To determine the radio resources to be allocated to the UE 110*a*, the base station 120 may use QoS mapping information (e.g., 'the mapping of PPPP and 5QI' and/or 'the mapping of PPPR and 5QI'). For example, if receiving the PQI from the UE 110*a* in step 1105, the base station 120 may convert the PQI received from the UE 110*a* to a PPPP (and/or PPPR) value using the QoS mapping information, and determine the radio resources to be allocated to the UE 110*a*. Alternatively, if receiving the PPPP (and/or PPPR) from the UE 110*a* in step 1105, it may convert the PPPP (and/or PPPR) received from the UE 110*a* to a PQI value using the QoS mapping information stored in the base station 120, and determine the radio resources to be allocated to the UE 110*a*. Herein, the QoS mapping information may be obtained from the MME 125 according to step 809 of FIG. 8A. Alternatively, the QoS mapping information may be pre-configured in the base station 120, and the base station 120 may use the pre-configured information.

In step 1107, the base station 120 may transmit an SL resource response message. The SL resource response message may include information of the radio resources allocated to the UE 110*a*. Herein, the radio resource may include at least one of a resource exclusively allocated to the UE 110*a* or a resource competitively used with other UE. In step 1109, the UE 110*a* may transmit data. The UE 110*a* may transmit the data by using at least part of the radio resources allocated from the base station 210.

In the embodiment described with reference to FIG. 11, the UE 110*a* may request resources for the direct communication from the base station 120. At this time, the UE 110*a* may selectively request one of the LTE PC5 resource or the NR PC5 resource. Herein, the LTE PC5 resource request and the NR PC5 resource request may be distinguished according to one of various methods.

According to an embodiment, the LTE PC5 resource request and the NR PC5 resource request may be distinguished by being performed by different messages. For example, if the UE 110*a* requests the PC5 resource from the base station 120, the UE 110*a* may use different SL resource request messages, to distinguish the LTE PC5 resource request and the NR PC5 resource request. Hence, the base station 120 may determine whether the requested resource is the LTE PC5 resource or the NR PC5 resource, by identifying the type of the SL resource request message.

According to an embodiment, the LTE PC5 resource request and the NR PC5 resource request may be distinguished by an indication in the message. For example, the same SL resource request message is used, but the UE 110*a* may include the indication indicating one of the LTE PC5 or the NR PC5 in the SL resource request message. Thus, the base station 120 may determine whether the requested resource is the LTE PC5 resource or the NR PC5 resource, by identifying the value of the indication included in the SL resource request message.

According to an embodiment, the LTE PC5 resource request and the NR PC5 resource request may be distinguished using a value of the destination address (e.g., Destination Layer-2 ID) included in the message. For example, values for indicating the destination address may be divided into a first range corresponding to the LTE PC5 resource and a second range corresponding to the NR PC5 resource. Specifically, in using one SL resource request message, the UE 110*a* may distinguish Destination Layer-2 ID indicating the LTE PC5 and Destination Layer-2 ID indicating the NR PC5 using different values. Hence, the base station 210 may determine whether the requested resource is the LTE PC5 resource or the NR PC5 resource, by identifying the destination address value included in the SL resource request message.

According to an embodiment, the LTE PC5 resource request and the NR PC5 resource request may be distinguished based on the type of the required parameter included in the message. For example, the message requesting the LTE PC5 resource may include the parameter used for the LTE-based direct communication, and the message requesting the 5G PC5 resource may include the parameter used for the 5G-based direct communication. Specifically, if requesting the LTE PC5 resource, the UE 110*a* may include only the PPPP (and/or PPPR) required by the data in the SL resource request message, and exclude the 5QI required by the data. Similarly, if requesting the NR PC5 resource, the UE 110*a* may include only the 5QI required by the data in the SL resource request message, and exclude the PPPP (and/or PPPR) required by the data. Hence, the base station 210 may determine whether the requested resource is the LTE PC5 resource or the NR PC5 resource, by identifying the type of the QoS related parameter included in the SL resource request message.

Figure 12:
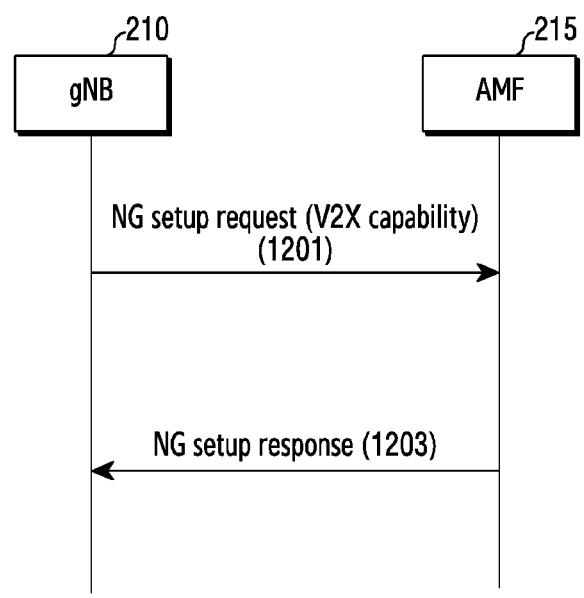
FIG. 12 illustrates a procedure for establishing connection between a base station and a second communication system in a wireless communication system according to an embodiment of the present disclosure.

FIG. 12 illustrates a procedure for establishing connection between a base station and a second communication system in a wireless communication system according to an embodiment of the present disclosure. FIG. 12 illustrates signaling between the gNB 210 and the AMF 215. The gNB 210 may be referred to as the NG-RAN.

Referring to FIG. 12, in step 1201, the gNB 210 transmits an NG setup request message to the AMF 215. The NG setup request message may include V2X capability information. In step 1203, the AMF 215 transmits an NG setup response message to the gNB 210. That is, the gNB 210 and the AMF 215 may exchange information used between the two, and perform the N2 setup procedure to configure connection information. The N2 setup procedure may be performed regardless of the UE.

According to the N2 setup procedure, the gNB 210 and the AMF 215 may obtain necessary information for their interconnection, and obtain information of capability supported by each entity. According to an embodiment, if performing the NG setup procedure with the AMF 215, the gNB 210 may inform the AMF 215 of whether it supports the V2X, and whether cross-RAT PC5 control capability is present. Herein, the cross-RAT PC5 control capability may mean capability of the gNB 210 for supporting both of the LTE PC5 and the NR PC5 for the V2X PC5 communication. In addition, the cross-RAT PC5 control capability may mean capability of the gNB 210 for setting and providing information for the NR PC5 in the LTE RAT to the terminal, or for setting and providing information for the LTE PC5 in the NR RAT to the terminal. The capability information may be delivered to the AMF 215 by being included in the message transmitted in step 1201 in the form of information such as radio capability of the gNB 210 or V2X capability of the gNB 210. The AMF 215 may complete the NG setup procedure, by transmitting the message to the gNB 210 in step 1203.

Figure 13:
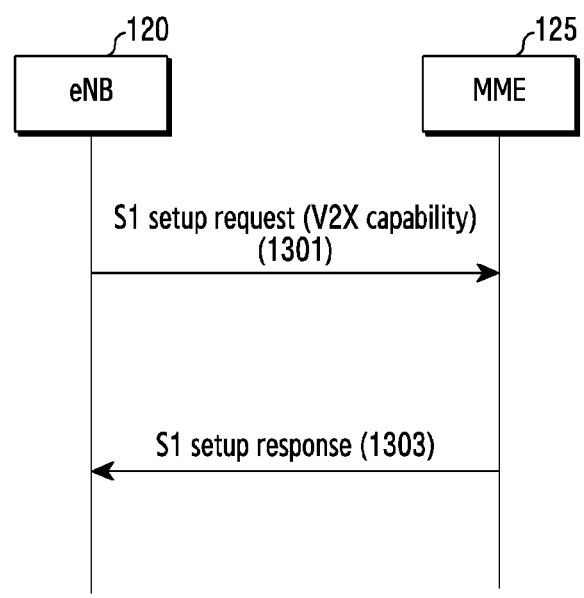
FIG. 13 illustrates a procedure for establishing connection between a base station and a first communication system in a wireless communication system according to an embodiment of the present disclosure.

FIG. 13 illustrates a procedure for establishing connection between a base station and a first communication system in a wireless communication system according to an embodiment of the present disclosure. FIG. 13 illustrates signaling between the eNB 120 and the MME 125. The eNB 120 may be referred to as an E-UTRAN.

Referring to FIG. 13, in step 1301, the eNB 120 transmits an S1 setup request message to the MME 125. The S1 setup request message may include V2X capability information. In step 1303, the MME 125 transmits an S1 setup response message to the eNB 120. The eNB 120 and the MME 125 may exchange information used between the two, and perform an S1 setup procedure to configure connection information. The S1 setup procedure may be conducted regardless of the UE.

According to the S1 setup procedure, the eNB 120 and the MME 125 may obtain necessary information for their interconnection, and obtain information of functionality supported by each entity. According to an embodiment, if performing the S1 setup procedure with the MME 125, the eNB 120 may inform the MME 125 of whether it supports the V2X, and whether it has cross-RAT PC5 control capability. Herein, the cross-RAT PC5 control capability may mean capability of the eNB 120 for supporting both the LTE PC5 and the NR PC5 for the V2X PC5 function. In addition, the cross-RAT PC5 control capability may mean capability of the eNB 120 for setting and providing information for the NR PC5 in the LTE RAT to the terminal, or for setting and providing information for the LTE PC5 in the NR RAT to the terminal. The capability information may be delivered to the MME 125 by being included in a message transmitted in step 1301 in the form of information such as radio capability of the eNB 120 or V2X capability of the eNB 120. The MME 125 may complete the NG setup procedure by transmitting the message to the eNB 120 in step 1303.

The UE according to various embodiments of the present disclosure may obtain function information supported by the network. Hereafter, a procedure for the UE to identifying a function supported by the network (e.g., a cross-RAT PC5 control function) through signaling from the base station is described through FIG. 14A through FIG. 14B.

Figure 14A:
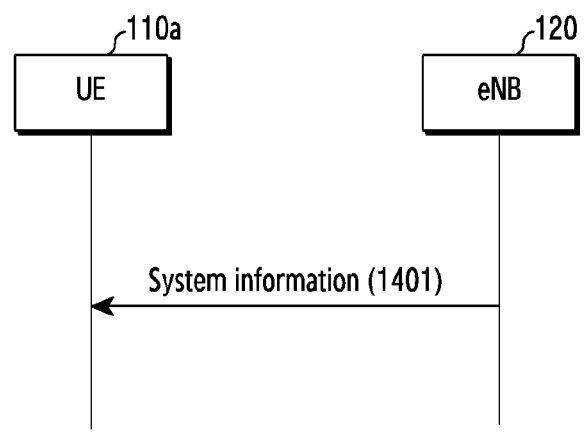
FIG. 14A illustrates a procedure for a terminal to obtain system information from a network in a wireless communication system according to an embodiment of the present disclosure.

FIG. 14A illustrates a procedure for a terminal to obtain system information from a network in a wireless communication system according to an embodiment of the present disclosure. FIG. 14 illustrates signaling between the terminal 110*a* and the base station. In FIG. 14A, the base station exemplifies the eNB 120. The eNB 120 may be referred to as the E-UTRAN.

Referring to FIG. 14A, the terminal 110*a* accessing the EPC network may receive system information from the base station (eNB) 120 in step 1401. The system information in step 1401 may include functionality supported by the base station 120. The functionality supported by the base station 120 may include cross-RAT PC5 control capability information. The system information in step 1401 may include PC5 resource information. The PC5 resource information may include LTE PC5 resource pool or NR PC5 resource pool information.

The terminal 110*a* receiving the system information of step 1401 from the base station 120 may perform a PC5 operation based on at least one of the functionality information supported by the base station 120 and the PC5 resource pool information included in the system information. For example, if the base station 120 supports the cross-RAT PC5 control function, the terminal 110*a* may transmit an LTE PC5 or NR PC5 resource request message to the base station 120. If the NR PC5 resource pool information is included in the system information, the terminal 110*a* may store the NR PC5 resource pool information received from the base station 120, and use it for NR PC5 communication. Alternatively, for example, if the base station 120 does not support the cross-RAT PC5 control function, the terminal 110*a* may transmit the LTE PC5 resource request message to the base station 120, and may not transmit the NR PC5 resource request message.

If the base station 120 does not support the cross-RAT PC5 control function, the base station 120 may include an indication indicating no support for the cross-RAT PC5 control function in the message (i.e., the system information (SI) message) of step 1401. Alternatively, the base station 120 may not include the cross-RAT PC5 control function related information in the message of step 1401. The terminal 110*a* may identify that the cross-RAT PC5 control function related information is not included in the message of step 1401. The terminal 110*a* may determine that the base station 120 does not support the cross-RAT PC5 control function based on the identification.

According to another embodiment, instead of the SI message of step 1401, the message (e.g., RRC connection reconfiguration/Initial Attach Response) of step 811 may be used.

Figure 14B:
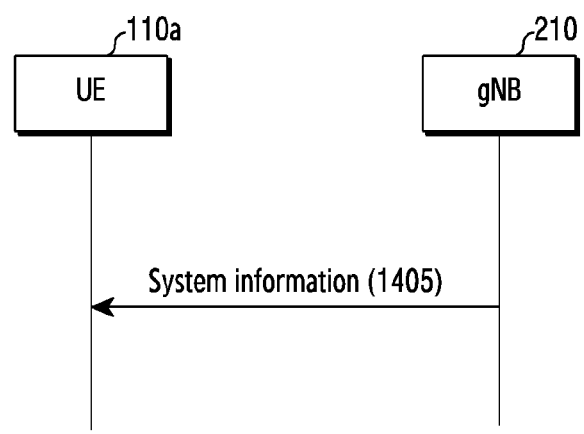
FIG. 14B illustrates another procedure for the terminal to obtain the system information from the network in the wireless communication system according to an embodiment of the present disclosure.

FIG. 14B illustrates another procedure for the terminal to obtain the system information from the network in the wireless communication system according to an embodiment of the present disclosure. FIG. 14 illustrates signaling between the terminal 110a and the base station. In FIG. 14B, the base station exemplifies the gNB 210. The gNB 210 may be referred to as the NG-RAN.

Referring to FIG. 14B, the terminal 110a accessing the 5G network may receive the system information from the base station (gNB) 210 in step 1451. The system information in step 1451 may include functionality supported by the base station 210. The functionality supported by the base station 210 may include the cross-RAT PC5 control capability information. The system information in step 1401 may include PC5 resource information. The PC5 resource information may include the LTE PC5 resource pool or NR PC5 resource pool information.

The terminal 110a receiving the system information of step 1451 from the base station 210 may perform the PC5 operation based on at least one of the functionality information supported by the base station 210 and the PC5 resource pool information included in the system information. For example, if the base station 210 supports the cross-RAT PC5 control function, the terminal 110a may transmit an LTE PC5 or NR PC5 resource request message to the base station 210. If the system information includes the LTE PC5 resource pool information, the terminal 110a may store the LTE PC5 resource pool information received from the base station 210, and use it for the LTE PC5 communication. Alternatively, for example, if the base station 210 does not support the cross-RAT PC5 control function, the terminal 110a may transmit the NR PC5 resource request message to the base station 210, and may not transmit the LTE PC5 resource request message.

If the base station 210 does not support the cross-RAT PC5 control function, the base station 210 may include an indication indicating no support for the cross-RAT PC5 control function in the message (i.e., the SI message) of step 1451. Alternatively, the base station 210 may not include the cross-RAT PC5 control function related information in the message of step 1451. The terminal 110a may identify that the cross-RAT PC5 control function related information is not included in the message of step 1451. The terminal 110a may determine that the base station 210 does not support the cross-RAT PC5 control function based on the identification.

According to another embodiment, in place of the SI which is the message of step 1451, the message (Registration Accept) message of step 915 may be used. The message (Registration Accept) of step 915 may be included in the RRC connection reconfiguration message and transmitted.

The terminal according to various embodiments of the present disclosure may obtain the function information supported by the network. The terminal 110a may register in the 5G system (e.g., 5GC) based on the procedure shown in FIG. 9A.

The terminal 110a may transmit a registration request message to the AMF 215 via the base station 210, in step 905 and step 907 of FIG. 9. The registration request message may include the capability information of the terminal in the form of 5GS mobility management (5GMM) capability or S1 UE network capability. For example, the capability information of the terminal may be PC5 capability for V2X (e.g., LTE PC5 only, NR PC5 only, both LTE and NR PC5). Also, for example, the capability information of the terminal may be the cross-RAT PC5 capability.

The AMF 215 receiving the registration request message of step 907, may obtain the UE subscription information from the UDM 235 in step 909. The UE subscription information may include at least one or more information of "V2X services authorized" indication, UE-PC5-AMBR per PC5 RAT, and cross-RAT PC5 control authorization.

According to another embodiment, the AMF 215 may obtain the policy information (e.g., V2X policy information, PC5 policy information, etc.) from the PCF 240 in step 911. The policy information may include at least one or more information of "V2X services authorized" indication, UE-PC5-AMBR per PC5 RAT, and cross-RAT PC5 control authorization.

The AMF 215 may determine information to be included in the registration accept message based on at least one of the registration request message received from the terminal 110a, the UE subscription information received from the UDM 235, and the policy information received from the PCF 240. For example, if the terminal 110a supports the NR PC5 function or supports the cross-RAT PC5 capability, and the cross-RAT PC5 authorization information is included in the UE subscription information or the policy information, the AMF 215 may determine to provide the terminal 110a with a cross-RAT PC5 scheduling function. The registration accept message may include information indicating that the cross-RAT PC5 scheduling is possible (e.g., "cross-RAT PC5 control authorized" indication). The AMF 215 may transmit the registration accept message to the base station 210 and the terminal 110a, in step 913 and step 915. The AMF 215 may transmit to the base station 210 the registration accept message including the information indicating that cross-RAT PC5 scheduling is possible. The AMF 215 may transmit the registration accept message including the information indicating that the cross-RAT PC5 scheduling is possible to the terminal 110a via the base station 210.

The base station 210 receiving the registration accept message from the AMF 215 may identify that the terminal 110a is authorized to use the cross-RAT PC5 scheduling function based on the information included in the registration accept message.

The terminal 110a receiving the registration accept message from AMF 215 may identify that the terminal 110a is authorized to use the cross-RAT PC5 scheduling function based on the information included in the registration accept message.

In some embodiments, the terminal 110a authorized by the AMF 215 for the cross-RAT PC5 scheduling may operate in-coverage in the NR PC5 and the LTE PC5. Hence, it may store the LTE PC5 resource pool information received from the base station 210 in step 1401 of FIG. 14, and use it for the LTE PC5 communication.

In addition, in some embodiments, the terminal authorized by the AMF 215 for the cross-RAT PC5 scheduling may perform the procedure of FIG. 10. In step 1003, the terminal 110a may determine to transmit the resource to the LTE PC5. In step 1005, the terminal 110a may transmit the LTE PC5 resource request message to the base station 210 (e.g., the gNB). The base station 210 may determine that the terminal 110a is a terminal authorized to make the LTE PC5 resource request, based on the information (e.g., the information indicating that cross-RAT PC5 scheduling is possible) received from the AMF 215 in step 1001. Thus, the base station 210 may allocate the LTE PC5 resource to the terminal 110a in step 1007. The terminal 110a allocated the LTE PC5 resource from base station 210, may transmit data to the LTE PC5 in step 1009.

In addition, in some embodiments, the terminal not authorized from AMF 215 for the cross-RAT PC5 scheduling may operate in-coverage in the NR PC5, and operate out-of-coverage in the LTE PC5.

In addition, in some embodiments, the terminal not authorized from the AMF 215 for the cross-RAT PC5 scheduling may not perform the procedure of FIG. 10, in the LTE PC5 communication.

In addition, in some embodiments, the terminal authorized from the AMF 215 for cross-RAT PC5 scheduling may perform the procedure of FIG. 10. The terminal 110a may determine to transmit the resource to the LTE PC5 in step 1003. In step 1005, the terminal 110a may transmit the LTE PC5 resource request message to the base station 210. Based on the information (e.g., the information indicating that the cross-RAT PC5 scheduling is possible) received from the AMF 215 in step 1001, the base station 210 may determine that the terminal 110a is a terminal not authorized for the LTE PC5 resource request. Accordingly, the base station 210 may not allocate the LTE PC5 resource to the terminal 110a in step 1007. The terminal 110a not allocated the LTE PC5 resource from the base station 210, may transmit data to the LTE PC5 in the out-of-coverage mode in step 1009.

The terminal according to various embodiments of the present disclosure may acquire the function information supported by the network. The terminal 110a may register in the EPC system by performing the procedure shown in FIG. 8A.

The terminal 110a may transmit an initial attach request message to the MME 125 via the base station 120 (e.g., the eNB), in step 801 and step 803 of FIG. 8. The initial attach request message may include the UE capability information in the form of UE network capability. For example, the UE capability information may include PC5 capability for V2X (e.g., LTE PC5 only, NR PC5 only, both LTE and NR PC5), cross-RAT PC5 capability, and so on.

The MME 125 receiving the initial attach request message of step 803, may obtain the UE subscription information from the HSS 135 in step 805. The UE subscription information may include at least one or more information of "V2X services authorized" indication, UE-PC5-AMBR per PC5 RAT, and cross-RAT PC5 control authorization.

The MME 125 may determine information to be included in the initial context setup request/initial attach response message based on at least one of the initial attach request message received from the terminal 110a and the UE subscription information received from the HSS 135. For example, if the terminal 110a supports the NR PC5 function or the cross-RAT PC5 capability, and the UE subscription information includes the cross-RAT PC5 authorization information, the MME 125 may determine to provide the terminal 110a with the cross-RAT PC5 scheduling function. The MME 125 may include information indicating that the cross-RAT PC5 scheduling is possible (e.g., "cross-RAT PC5 control authorized" indication) in the initial context setup request/initial Attach response message. The MME 125 may transmit the initial context setup request/initial attach response message to the base station 120 and the terminal 110a in step 809 through step 811. The MME 125 may transmit the initial context setup request/initial attach response message to the base station 120 in step 809. The MME 125 may transmit the initial context setup request/initial attach response message to the terminal 110a via the base station 120 in step 809.

The base station 120 receiving the initial context setup request message from the MME 125 may identify that the terminal 110a is authorized to use the cross-RAT PC5 scheduling function based on the information included in the initial context setup request message.

The terminal 110a receiving the initial attach response message from the MME 125 may identify that the terminal 110a is authorized to use the cross-RAT PC5 scheduling function based on the information included in the initial attach response message.

In addition, in some embodiments, the terminal authorized by the MME for the cross-RAT PC5 scheduling may operate in-coverage in the NR PC5 and the LTE PC5. Accordingly, the NR PC5 resource pool information received from the base station 120 in step 1401 of FIG. 14 may be stored, and used for the NR PC5 communication.

In addition, in some embodiments, the terminal authorized by the MME for the cross-RAT PC5 scheduling may perform the procedure of FIG. 11. The terminal 110a may determine to transmit the resource to the NR PC5 in step 1103. The terminal 110a may transmit an NR PC5 resource request message to the base station 120 in step 1105. Based on the information (e.g., information indicating that the cross-RAT PC5 scheduling is possible) received from the MME 125 in step 1101, the base station 120 may determine that the terminal 110a is the terminal authorized to make the NR PC5 resource request. Hence, the base station 120 may allocate the NR PC5 resource to the terminal 110a in step 1107. The terminal 110a allocated the NR PC5 resource from the base station 120 may transmit data to the NR PC5 in step 1109.

In addition, in some embodiments, the terminal not authorized by the MME for the cross-RAT PC5 scheduling may operate in-coverage in the LTE PC5, and operate out-of-coverage in the NR PC5.

In addition, in some embodiments, the terminal not authorized by the MME for the cross-RAT PC5 scheduling may not perform the procedure of FIG. 11, in the NR PC5 communication.

In addition, in some embodiments, the terminal not authorized by the MME 125 for the cross-RAT PC5 scheduling may perform the procedure of FIG. 11. The terminal 110a may determine to transmit the resource to the NR PC5 in step 1103. The terminal 110a may transmit the NR PC5 resource request message to the base station 120 in step 1105. Based on the information (e.g., information indicating that the cross-RAT PC5 scheduling is possible) received from the MME 125 in step 1101, the base station 120 may determine that the terminal 110a is the terminal not authorized for the NR PC5 resource request. Thus, the base station 120 may not allocate the NR PC5 resource to the terminal 110a in step 1107. The terminal 110a not allocated the NR PC5 resource from the base station 120 may transmit data to the NR PC5 in the out-of-coverage mode, in step 1109.

FIG. 3 has illustrated the interworking structure of the 5G system and the EPC system according to various embodiments of the present disclosure. The AMF 215 and the MME 125 may be connected through the N26 interface.

The terminal 110a according to various embodiments of the present disclosure may be registered in the 5G system (e.g., 5GC) and connected to the AMF 215. The AMF 215 may store the UE capability information (e.g., including at least one of PC5 capability for V2X (LTE PC5 only, NR PC5 only, both LTE and NR PC5), cross-RAT PC5 capability) received from the terminal in step 907 of FIG. 9A. The AMF 215 may store the UE capability information as UE context. The AMF 215 may store the UE subscription information or the policy information received from the UDM 235 or the PCF 240 in step 909 through step 911 of FIG. 9A. The AMF 215 may store the UE subscription information or the policy information as the UE context. The UE subscription information or the policy information may include at least one or more information of PC5 authorized information (whether the UE is authorized to perform V2X communication over PC5 reference point as Vehicle UE, Pedestrian UE, or both, including for LTE PC5 and for NR PC5), "V2X service authorized" indication, UE-PC5-AMBR per PC5 RAT, cross-RAT PC5 control authorization, PLMN list (the list of the PLMNs where the UE is authorized to perform V2X communication over PC5 reference point). For each PLMN in the list, the RAT(s) over which the UE is authorized to perform V2X communications over PC5 reference point, and PC5 QoS parameters are included.

According to various embodiments of the present disclosure, the terminal 110a registered in the 5G system and connected to the AMF 215 may move to the EPC system (e.g., handover, idle mode mobility, connected mode mobility, etc.). Hence, the AMF 215 may transmit the UE context stored in the AMF 215 to the MME 125 through the N26 interface. The UE context may include the UE capability information, the UE subscription information, the policy information, and the like. The MME 125 may store and use the UE context received from the AMF 215.

For example, the UE context may include information indicating that the terminal 110a may use the LTE PC5 function and the NR PC5 function, and that the terminal 110a is a terminal authorized for the cross-RAT PC5 control. Based on the UE context, the MME 125 may determine to provide the UE 110a with the cross-RAT PC5 scheduling function.

The AMF 215 may determine UE context information to transmit to the MME 125. For example, the AMF 215 may identify whether the PLMN ID of the MME 125 is included in the PLMN list of the UE context. If the PLMN list includes the PLMN ID of the MME 125, the AMF 215 may include the PLMN list in the UE context information transmitted to the MME 125. If the PLMN list does not include the PLMN ID of the MME 125, the AMF 215 may not include the PLMN list in the UE context information transmitted to the MME 125.

To transmit the UE context to the MME 125, the AMF 215 may convert the UE context of the 5G format to the UE context of the EPS format. For example, the UE context converted into the EPS format may be referred to as mapped EPS UE contexts or mapped EPS UE contexts for V2X. The AMF 215 may transmit the UE context converted into the EPS format to the MME 125 through the N26 interface. The UE context converted into the EPS format may be included in a message such as relocation request, relocation complete notification, and context response and transmitted to the MME 125.

The MME 125 may include information (e.g., "cross-RAT PC5 control authorized" indication) indicating that the cross-RAT PC5 scheduling is possible in a message (e.g., initial context setup request, handover request, etc.) transmitted to the base station 120 to which the UE 110a is connected. The base station 120 receiving the message from the MME 125 may identify that the terminal 110a is authorized to use the cross-RAT PC5 scheduling function based on the information included in the message.

The MME 125 may include the information (e.g., "cross-RAT PC5 control authorized" indication) indicating that the cross-RAT PC5 scheduling is possible in a message (e.g., TAU accept, etc.) transmitted to the terminal 110a. The terminal 110a receiving the message from the MME 125 may identify that the terminal 110a is authorized to use the cross-RAT PC5 scheduling function based on the information included in the message.

The terminal 110a according to various embodiments of the present disclosure may be registered in the EPC system and connected to the MME 125. The MME 125 may store the UE capability information (e.g., PC5 capability for V2X (LTE PC5 only, NR PC5 only, both LTE and NR PC5), cross-RAT PC5 capability) received from the terminal in step 803 of FIG. 8A. The MME may store the UE capability information as the UE context. The MME 125 may store the UE subscription information received from the HSS 135 in step 807 of FIG. 8A. The MME 125 may store the UE subscription information as the UE context. The UE subscription information may include at least one or more information of PC5 authorized information (whether the UE is authorized to perform V2X communication over PC5 reference point as Vehicle UE, Pedestrian UE, or both, including for LTE PC5 and for NR PC5), "V2X service authorized" indication, UE-PC5-AMBR per PC5 RAT (including UE-PC5-AMBR for LTE PC5 and UE-PC5-AMBR for NR PC5), cross-RAT PC5 control authorization, PLMN list (the list of the PLMNs where the UE is authorized to perform V2X communication over PC5 reference point). For each PLMN in the list, the RAT(s) over which the UE is authorized to perform V2X communications over PC5 reference point, and PC5 QoS parameters are included.

According to various embodiments of the present disclosure, the terminal 110a registered in the EPC system and connected to the MME 125 may move to the 5G system (e.g., handover, idle mode mobility, connected mode mobility, etc.). Hence, the MME 125 may transmit the UE context stored in the MME 125 to the AMF 215 through the N26 interface. The UE context may include the UE capability information, the UE subscription information, the policy information, and the like.

The MME 125 may determine UE context information to transmit to the AMF 215. For example, the MME 125 may identify whether the PLMN ID of the AMF 215 is included in the PLMN list of the UE context. If the PLMN list includes the PLMN ID of AMF 215, the MME 125 may include the PLMN list in the UE context information transmitted to the AMF 215. If the PLMN list does not include the PLMN ID of the AMF 215, the MME 125 may not include the PLMN list in the UE context information transmitted to the AMF 215.

The MME 125 may transmit the UE context of the EPS format to the AMF 215 through the N26 interface. The UE context of the EPS format may be included in a message such as forward relocation request, forward relocation complete notification ack, and context response and transmitted to the AMF 215.

The AMF 215 may store and use the UE context received from the MME 125.

For example, the AMF 215 may convert the UE context of the EPS format received from the MME 125 to the UE context of the 5G format. The UE context may include information indicating that the terminal 110a may use the LTE PC5 function and the NR PC5 function, and that the terminal 110a is authorized for the cross-RAT PC5 control. Based on the UE context, the AMF 215 may determine to provide the cross-RAT PC5 scheduling function to the UE 110a.

The AMF 215 may include information (e.g., "cross-RAT PC5 control authorized" indication) indicating that the cross-RAT PC5 scheduling is possible in a message (e.g., initial context setup request, handover request, etc.) transmitted to the base station 210 connected to the terminal 110a. The base station 210 receiving the message from the AMF 215 may identify that the terminal 110a is authorized to use the cross-RAT PC5 scheduling function based on the information included in the message.

The AMF 215 may include the information (e.g., "cross-RAT PC5 control authorized" indication) indicating that the cross-RAT PC5 scheduling is possible in a message (e.g., registration accept, etc.) transmitted to the terminal 110a. The terminal 110a receiving the message from the AMF 125 may identify that the terminal 110a is authorized to use the cross-RAT PC5 scheduling function based on the information included in the message.

Various embodiments of the present disclosure are related to the cross-RAT PC5 control capability of the terminal. The UE capability information of the terminal may include information (e.g., information element (IE)) for indicating whether the cross-RAT PC5 control capability is supported or not. The cross-RAT PC5 control capability may indicate the capability that the eNB 120 may configure the information for the NR PC5 in the LTE RAT and provide it to the terminal, or configure the information for the LTE PC5 in the NR RAT and provide it to the terminal. The policy information delivered by the policy related entity (e.g., the PCF 240) to the authorization management entity (e.g., the AMF 215) may include at least one or more information of "V2X services authorized" indication, UE-PC5-AMBR per PC5 RAT, cross-RAT PC5 control authorization.

In various embodiments of the present disclosure, the message (e.g., a registration accept message) between the terminal, the base station (e.g., the eNB 120 or the gNB 120), and the core network entity (e.g., the AMF 215) may include the information (e.g., "cross-RAT PC5 control authorized" indication) indicating that the cross-RAT PC5 scheduling is possible. The terminal may perform the LTE PC5 communication in the in-coverage mode or the out-of-coverage mode, depending on whether it is authorized by the AMF for the cross-RAT PC5 scheduling. In addition, the terminal may perform the NR PC5 communication in the in-coverage mode or the out-of-coverage mode, depending on whether it is authorized by the MME for the cross-RAT PC5 scheduling.

In some embodiments, the base station may determine whether the terminal is authorized for the cross-RAT PC5 scheduling based on the information obtained from the AMF. The base station may determine whether to allocate the resource for the LTE PC5 communication to the terminal based on the determination. If the terminal is not authorized by the AMF for the cross-RAT PC5 scheduling, the base station may not allocate the resource for the LTE PC5 communication to the terminal. The terminal may perform the LTE PC5 communication in the out-of-coverage mode. If the terminal is authorized by the AMF for the cross-RAT PC5 scheduling, the base station may allocate the resource for the LTE PC5 communication to the terminal. The terminal may perform the LTE PC5 communication in the in-coverage mode.

In addition, in some embodiments, the base station may determine whether the terminal is authorized for the cross-RAT PC5 scheduling based on information obtained from the MME. The base station may determine whether to allocate the resource for the NR PC5 communication to the terminal based on the determination. If the terminal is not authorized by the MME for the cross-RAT PC5 scheduling, the base station may not allocate the resource for the NR PC5 communication to the terminal. The terminal may perform the NR PC5 communication in the out-of-coverage mode. If the terminal is authorized by the MME for the cross-RAT PC5 scheduling, the base station may allocate the resource for the LTE NR communication to the terminal. The terminal may perform the NR PC5 communication in the in-coverage mode.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. In addition, a plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the disclosure. Thus, the scope of the disclosure is not limited and defined by the described embodiment and is defined not only the scope of the claims as below but also their equivalents.

The invention claimed is:

1. A method performed by a mobile management entity (MME), the method comprising:
   receiving an attach request message or a tracking area update (TAU) message comprising user equipment (UE) capability information, from a UE;
   receiving a message comprising subscription information comprising quality of service (QOS) parameters, a UE-PC5-aggregated maximum bit rate (AMBR) for long term evolution (LTE) PC5, and a UE-PC5-AMBR for new radio (NR) PC5, from a home subscription server (HSS); and transmitting the QoS parameters, the UE-PC5-AMBR for LTE PC5, and the UE-PC5-AMBR for NR PC5 included in the received subscription information through an initial context setup request message or a handover request message to a base station (BS), wherein the UE capability information indicates whether the UE supports new radio (NR) PC5, and wherein the QoS parameters indicate 5G quality of service indicator (5QI) for vehicle to everything (V2X).

2. The method of claim 1, wherein the subscription information further includes an indication indicating V2X service authorization per PC5 radio access technology (RAT), and wherein the indication indicating V2X service authorization per PC5 RAT is included in the initial context setup request message or the handover request message.

3. The method of claim 2, further comprising:

receiving V2X related information from an access and mobility management function (AMF), wherein the V2X related information comprises information indicating V2X services authorized per PC5 RAT, a UE-PC5-AMBR per PC5 RAT, and PC5 QoS parameters.

4. A mobile management entity (MME), the MME comprising:

at least one transceiver; and at least one processor, wherein the at least one processor is configured to:

receive an attach request message or a tracking area update (TAU) message comprising user equipment (UE) capability information, from a UE, receive a message comprising subscription information comprising quality of service (QoS) parameters, a UE-PC5-aggregated maximum bit rate (AMBR) for long term evolution (LTE) PC5, and a UE-PC5-AMBR for new radio (NR) PC5, from a home subscription server (HSS), and transmit the QoS parameters, the UE-PC5-AMBR for LTE PC5, and the UE-PC5-AMBR for NR PC5 included in the received subscription information through an initial context setup request message or a handover request message to a base station (BS), wherein the UE capability information indicates whether the UE supports new radio (NR) PC5, and wherein the QoS parameters indicate 5G quality of service indicator (5QI) for vehicle to everything (V2X).

5. The MME of claim 4, wherein the subscription information further includes an indication indicating V2X service authorization per PC5 radio access technology (RAT), and wherein the indication indicating V2X service authorization per PC5 RAT is included in the initial context setup request message or the handover request message.

6. The MME of claim 5, wherein the at least one processor is further configured to receive V2X related information from an access and mobility management function (AMF), and wherein the V2X related information comprises information indicating V2X services authorized per PC5 RAT, a UE-PC5-AMBR per PC5 RAT and PC5 QoS parameters.

* * * * *